United States Patent
Kawaura et al.

(10) Patent No.: US 7,644,288 B2
(45) Date of Patent: Jan. 5, 2010

(54) IMAGE FORMING APPARAUTS THAT CHECKS AUTHENTICITY OF AN UPDATE PROGRAM

(75) Inventors: Hisanori Kawaura, Yokohama (JP); Nobuhito Inami, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 575 days.

(21) Appl. No.: 10/801,684

(22) Filed: Mar. 17, 2004

(65) Prior Publication Data

US 2004/0239975 A1   Dec. 2, 2004

(30) Foreign Application Priority Data

Mar. 19, 2003 (JP) ............................ 2003-076604
Mar. 2, 2004 (JP) ............................ 2004-057678
Mar. 2, 2004 (JP) ............................ 2004-057679

(51) Int. Cl.
  *G06F 11/30* (2006.01)
  *G06F 12/14* (2006.01)
(52) U.S. Cl. ......................... 713/191; 713/158; 713/176
(58) Field of Classification Search ................ 713/158, 713/174, 176, 191
See application file for complete search history.

(56) References Cited

U.S. PATENT DOCUMENTS

| | | | | |
|---|---|---|---|---|
| 5,548,728 A | * | 8/1996 | Danknick | 709/213 |
| 5,778,070 A | * | 7/1998 | Mattison | 713/191 |
| 5,926,624 A | * | 7/1999 | Katz et al. | 709/217 |
| 5,956,408 A | * | 9/1999 | Arnold | 713/189 |
| 6,009,524 A | * | 12/1999 | Olarig et al. | 726/10 |
| 6,023,727 A | * | 2/2000 | Barrett et al. | 709/221 |
| 6,363,463 B1 | * | 3/2002 | Mattison | 711/164 |
| 6,378,069 B1 | * | 4/2002 | Sandler et al. | 713/153 |
| 6,381,741 B1 | * | 4/2002 | Shaw | 717/168 |
| 6,546,492 B1 | * | 4/2003 | Walker et al. | 726/3 |
| 6,581,159 B1 | * | 6/2003 | Nevis et al. | 713/2 |
| 6,615,355 B2 | * | 9/2003 | Mattison | 713/193 |
| 6,694,434 B1 | * | 2/2004 | McGee et al. | 713/189 |

(Continued)

FOREIGN PATENT DOCUMENTS

JP        7-244584        9/1995

(Continued)

OTHER PUBLICATIONS

U.S. Appl. No. 11/007,708, filed Dec. 9, 2004, Kawaura et al.

(Continued)

*Primary Examiner*—David García Cervetti
(74) *Attorney, Agent, or Firm*—Oblon, Spivak, McClelland, Maier & Neustadt, L.L.P.

(57) ABSTRACT

An image forming apparatus is disclosed, the image forming apparatus including a storing unit that stores a program in accordance with which the image forming apparatus operates, an acquiring unit that acquires an update program from an external source, and an updating unit. Before updating the program stored in the storing unit, the updating unit determines whether the update program acquired by the acquiring unit is authentic by checking the electronic signature of the update unit. If the updating unit determines that the update program acquired by the acquiring unit is authentic, the updating unit updates the program stored in the storing unit. Accordingly, the image forming apparatus can improve the reliability of the update program.

28 Claims, 27 Drawing Sheets

U.S. PATENT DOCUMENTS

| | | | |
|---|---|---|---|
| 6,944,425 B2* | 9/2005 | Fallenstein | 455/41.2 |
| 6,976,163 B1* | 12/2005 | Hind et al. | 713/156 |
| 6,990,444 B2* | 1/2006 | Hind et al. | 704/235 |
| 6,993,650 B2* | 1/2006 | Landers et al. | 713/100 |
| 2002/0120722 A1* | 8/2002 | Kutaragi et al. | 709/220 |
| 2003/0037246 A1* | 2/2003 | Goodman et al. | 713/191 |
| 2003/0050010 A1* | 3/2003 | Fallenstein | 455/41 |
| 2003/0084275 A1* | 5/2003 | David et al. | 713/1 |
| 2004/0042363 A1* | 3/2004 | Kobayashi et al. | 369/53.21 |
| 2004/0060044 A1* | 3/2004 | Das et al. | 717/171 |
| 2005/0158100 A1* | 7/2005 | Yamaguchi et al. | 400/62 |

FOREIGN PATENT DOCUMENTS

| | | |
|---|---|---|
| JP | 8-137339 | 5/1996 |
| JP | 9-282155 | 10/1997 |
| JP | 2000-232442 | 8/2000 |
| JP | 2001-067408 | 3/2001 |
| JP | 2002-14906 | 1/2002 |
| JP | 2002-55839 | 2/2002 |
| JP | 2002-166628 | 6/2002 |
| JP | 2002-307718 | 10/2002 |

OTHER PUBLICATIONS

U.S. Appl. No. 10/227,308, filed Aug. 26, 2002, Kawaura.
U.S. Appl. No. 10/227,303, filed Aug. 26, 2002, Kawaura.
U.S. Appl. No. 10/429,865, filed May 6, 2003, Kobayashi et al.

\* cited by examiner

FIG.6

```
+ init.d    + copy.cnf
|           + copy.lic
|           + printer.cnf
|           + printer.lic
|           + scanner.cnf
|           + scanner.lic
|           + fax.cnf
|           + fax.lic
|           + network.cnf
|           + network.lic
|
+ module    + copy.mod
|           + copy.mac
|           + printer.mod
|           + printer.mac
|           + scanner.mod
|           + scanner.mac
|           + fax.mod
|           + fax.mac
|           + network.mod
|           + network.mac
|
+ back up
```

FIG.13
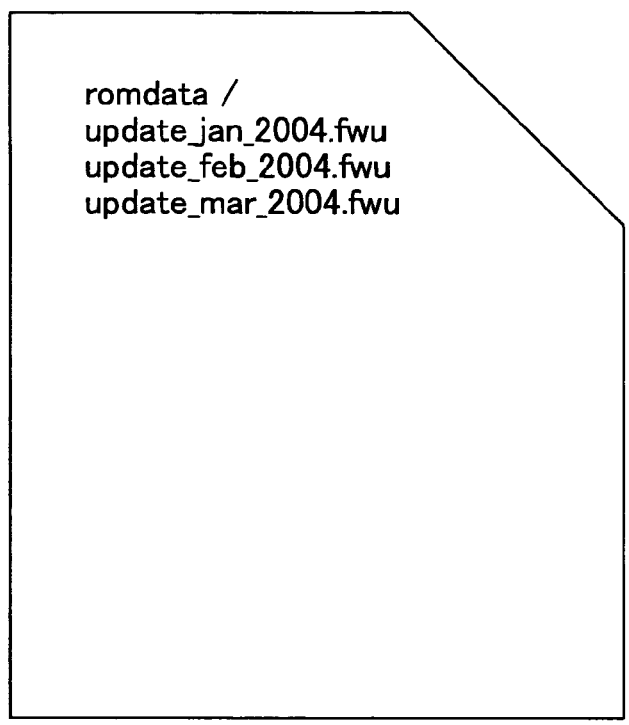
FIG.14
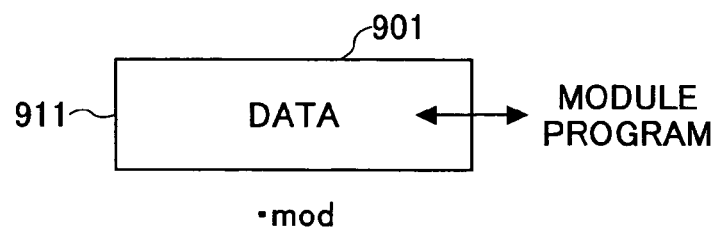
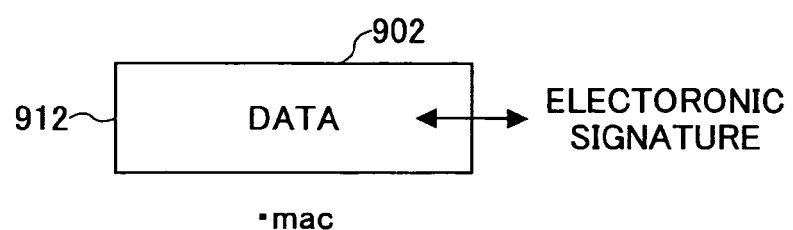

FIG.15

261 init.d /
copy.cnf
copy.lic
printer.cnf
printer.lic
scanner.cnf
scanner.lic
fax.cnf
fax.lic
network.cnf
network.lic module /
copy.mod
copy.mac
printer.mod
printer.mac
scanner.mod
scanner.mac
fax.mod
fax.mac
network.mod
network.mac back up /

IMAGE FORMING APPARAUTS THAT CHECKS AUTHENTICITY OF AN UPDATE PROGRAM

BACKGROUND OF THE INVENTION

1. Field of the Invention

The present invention generally relates to an image forming apparatus and a method of updating a program thereof, and more particularly, to an image forming apparatus that can improve the reliability of updated program.

2. Description of the Related Art

A Multifunctional Peripheral (MFP) is an image forming apparatus that operates as a copier, a printer, a scanner, and a facsimile machine. MFPs are available in the market. The MFP includes hardware such as an image capture unit, a printer unit, and a communication unit, for example. Computer software corresponding to copying function, printer function, scanner function, and facsimile function is installed in the MFP. For example, when the computer software corresponding to copying function is activated, the MFP operates as a copier. When the computer software corresponding to printer function is activated, the MFP operates as a printer. When the MFP operates as a copier or a printer, the MFP prints an image on a recording medium such as paper. When the MFP operates as a scanner or a facsimile machine, the MFP transmits an image to another device via a network.

The operation of an MFP requires various programs (provided as firmware or software) such as an application and a platform. When the computer programs are updated, new programs replacing old computer programs need to be reliable. The new programs are usually provided via a memory card or a network. The new programs stored in the memory card or transmitted via the network may be altered or damaged.

SUMMARY OF THE INVENTION

Accordingly, it is a general object of the present invention to provide a novel and useful image forming apparatus in which at least one of the above problems is eliminated.

Another and more specific object of the present invention is to provide an image forming apparatus that, when programs thereof are updated, can improve the reliability of new programs.

To achieve at least one of the above objects, an image forming apparatus according to an aspect of the present invention, includes:

a storing unit that stores a program in accordance with which the image forming apparatus operates;

an acquiring unit that acquires an update program from an external source; and an updating unit that determines whether an electronic signature of the update program acquired by said acquiring unit is authentic and, if the electronic signature of the acquired update program is determined to be authentic, updates the program stored in said storing unit using the acquired update program.

The program stored in the storing unit is to be updated with the update program acquired by the acquiring unit. Before the update program updates the program stored in the storing unit, the updating unit determines whether the update program acquired by the acquiring unit is authentic by checking the electronic signature of the update program. If the updating unit determines that the update program acquired by the acquiring unit is not authentic, the updating unit does not update the program stored in the storing unit. Accordingly, the image forming apparatus can improve the reliability of the update program.

An image forming apparatus according to another aspect of the present invention includes:

a storing unit that stores a program in accordance with which the image forming apparatus operates;

an acquiring unit that acquires an update program from an external source; and an updating unit that updates the program stored in said storing unit using the update program acquired by said acquiring unit, wherein after updating the program stored in said storing unit, said updating unit determines whether an electronic signature of the updated program is authentic and, if the electronic signature of the updated program is authentic, said updating unit maintains the updated program.

After the updating unit updates the program stored in the storing unit with the update program acquired by the acquiring unit, the updating unit determines whether the program updated by the update program by checking the electronic signature of the updated program. Accordingly, the image forming apparatus according to the present invention can improve the reliability of the update program.

Other objects, features, and advantages of the present invention will become more apparent from the following detailed description when read in conjunction with the accompanying drawings.

BRIEF DESCRIPTION OF THE DRAWINGS

FIG. 6 shows a file tree of files stored in a memory card according to an embodiment;

FIG. 13 shows file configuration in the update memory card according to an embodiment;

FIG. 14 shows the data structure of data stored in a memory card according to an embodiment;

FIG. 15 shows file configuration in the memory card according to an embodiment;

DETAILED DESCRIPTION OF THE PREFERRED EMBODIMENTS

Figure 1:
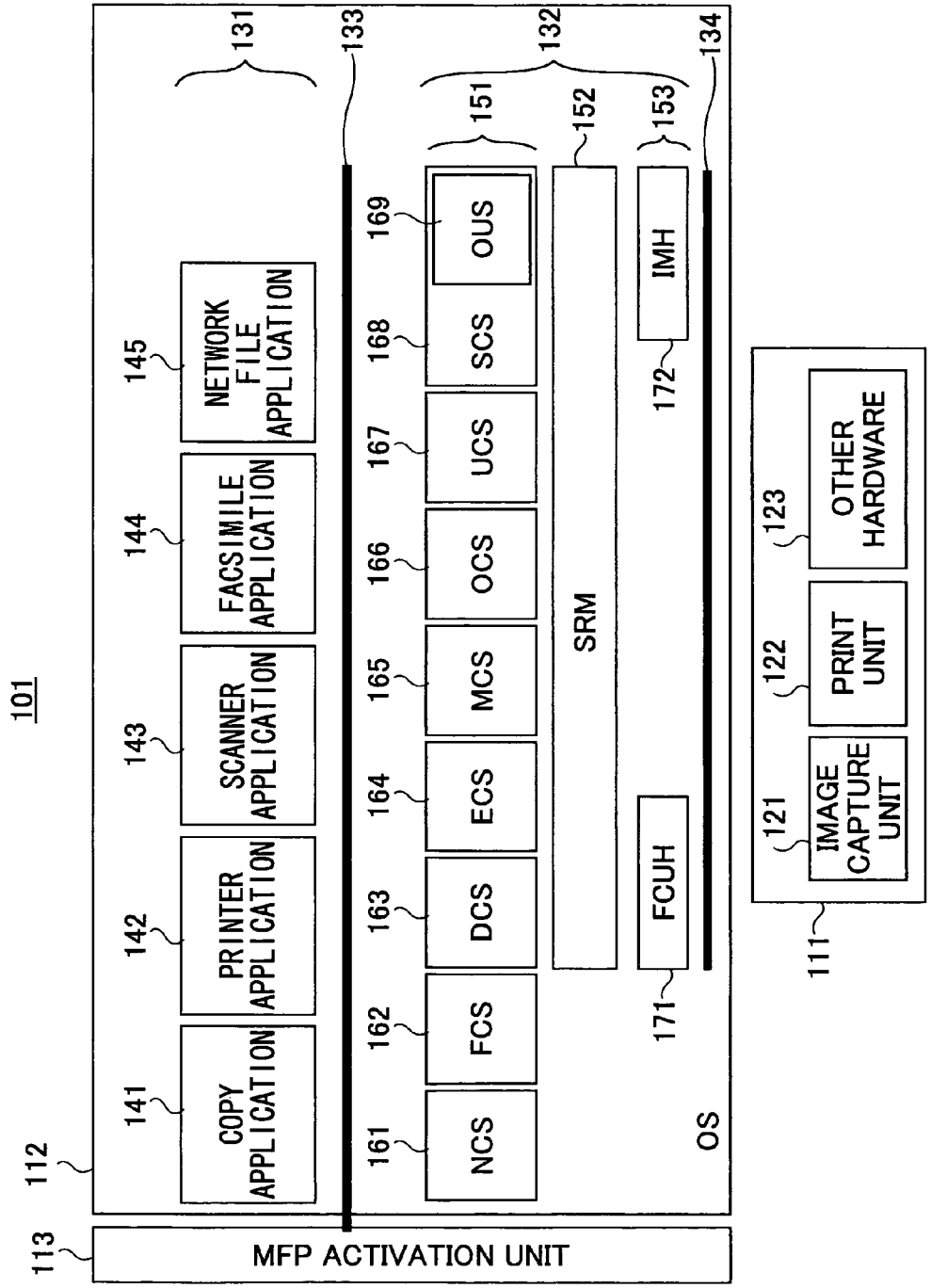
FIG. 1 shows an MFP according to an embodiment of the present invention.

FIG. 1 shows an MFP 101 according to an embodiment of the present invention. The MFP 101 shown in FIG. 1 includes various items of hardware 111, various items of software 112, and MFP activation unit 113. These units causes the MFP 101 shown in FIG. 1 to function as a copier, a printer, a scanner, and a facsimile machine.

The hardware 111 includes a image capture unit 121, a printer unit 122, and other items of hardware 123.

The image capture unit 121 is an item of hardware for capturing an image (image data) from a document. When the MFP operates as a copier, a scanner, or a facsimile machine, the image capture unit 121 is used. The image capture unit 121 may be monochrome or color. The image capture unit 121 includes a document setting unit in which the document is set.

The printer unit 122 is an item of hardware for printing an image (image data) on a sheet of paper, for example. When the MFP operates as a copier, a printer, or a facsimile machine, the printer unit 122 is used. The printer unit 122 may be monochrome or color. The printer unit 122 forms an image by electrophotography, and therefore includes a photosensitive unit, a charging unit, an exposure unit, a development unit, a transfer unit, and a fixing unit, for example. The printer unit 122 further includes a paper feed unit, a discharged paper unit, and a paper transport mechanism, for example.

The other items of hardware 123 are described with reference to FIG. 2.

The software 112 includes various applications 131 and platforms 132. These items of software 112 run on an operating system (OS) such as UNIX (trade mark) in parallel.

The applications 131 are items of software for realizing specific functions such as copying, printing, scanning, and facsimile, for example. The applications 131 include a copy application 141, a printer application 142, a scanner application 143, and a facsimile application 144, and a network file application 145. The network file application 145 is configured by a Web server program for distributing HTML documents, for example, and a Web browser program for browsing HTML documents, for example.

The platforms 132 are items of software that process information related to requests for processing from the applications 131 to the hardware 111. The applications 131 request the platforms 132 for processing by calling predefined functions of Application Interface (API) 133. The platforms 132 request the hardware 111 for processing by calling predefined functions of Engine Interface (ENI) 134. The platforms 132 includes various control services 151, a system resource manager 152, and various handlers 153.

The control service 151 interprets a request for processing from the application 131 to the hardware 111, and generates a request for gaining the hardware 111 based on the interpretation. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a user directory control service (UCS) 167, a system control service (SCS) 168, and an on-demand update service (OUS) 169.

The process of NCS 161 provides API for communicating via a network. The process of FCS 163 provides API for exchanging, acquiring, and printing image data as a facsimile machine. The process of DCS 163 controls the distributing of document data stored in the MFP 101. The process of ECS 164 controls the engine units such as the image capture unit 121 and the print unit 122. The process of MCS 165 controls memory and a hard disk drive used for storing and processing image data. The process of OCS 166 controls an operation panel. The process of UCS 167 controls user information. The process of SCS 168 controls system. The process of OUS 169 controls the updating of programs.

A system resource manager (SRM) 152 arbitrates requests for acquiring the hardware 111, and controls the hardware 111 based on the result of the arbitration. Specifically, the process of SRM 152 determines in response to receipt of a request for acquiring the hardware 111 whether the hardware 111 is usable, that is, whether the request conflicts with another request for acquiring the hardware 111. If the hardware 111 is usable, the process of SRM 152 informs the control service 151. The process of SRM 152 schedules the use of the hardware 111, and controls the hardware 111 based on the schedule.

A handler 153 manages the hardware 111 based on the result of arbitration. The handler 153 includes a facsimile control unit handler. (FCUH) 171 and an image memory handler (IMH) 172. The FCUH 171 controls the facsimile control unit. The IMH 172 allocates memory to processes, and manages the memory allocated to the processes.

When the MFP 101 is turned on, the MFP activation unit 113 is executed first. The MFP activation unit 113 activates the OS such as UNIX (trade mark), and then, activates the application 131 and the platform 132. These programs are stored in a memory card, for example. These programs are retrieved from the memory card, and loaded to a memory.

Figure 2:
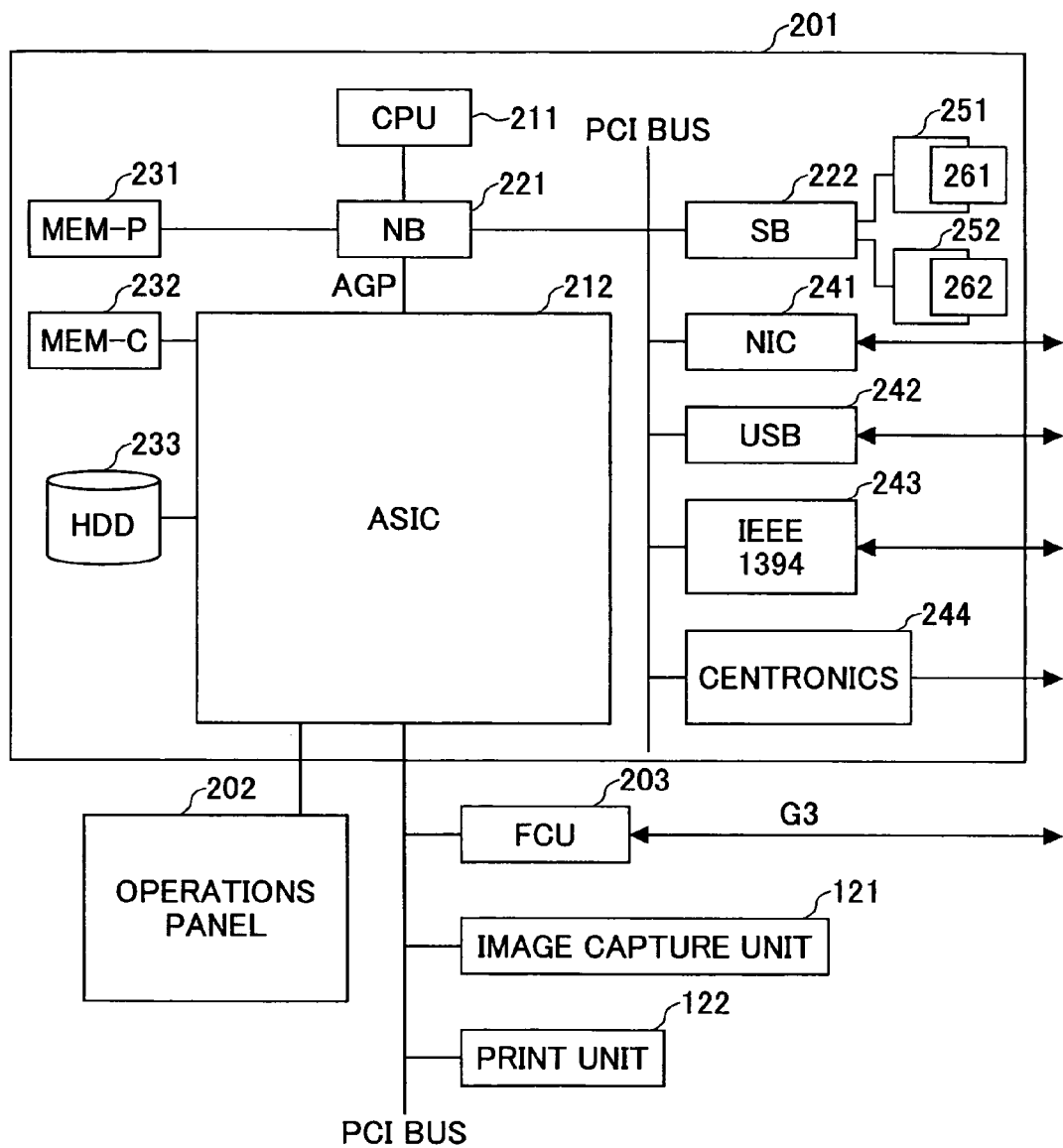
FIG. 2 shows the hardware of the MFP shown in FIG. 1.

FIG. 2 shows the hardware 111 of the MFP 101 shown in FIG. 1. The hardware 111 includes a controller 201, an operation panel 202, a facsimile control unit (FCU) 203, a image capture unit 121, and a print unit 122. Elements shown in FIG. 2 other than the image capture unit 121 and the print unit 122 corresponds to the other hardware 123 shown in FIG. 1.

The controller 201 is configured by a CPU 211, an ASIC 212, a north bridge (NB) 221, a south bridge (SB) 222, a system memory (MEM-P) 231, a local memory (MEM-C) 232, a hard disk drive (HDD) 233, a network interface controller (NIC) 241, a USB device 242, an IEEE 1394 device 243, a Centronics device 244, a memory card slot 251, and an update memory card slot 252.

The CPU 211 is hardware for processing various items of information. For example, the CPU 211 executes the OS such as UNIX (trade mark), the application 131, and the platform 132. Each process of the application 131 and each process of the platform are executed on the OS in parallel. The ASIC 212 is an integrated circuit (IC) for processing image data. The NB 221 is a bridge for connecting the CPU 211 and ASIC 212. The SB 222 is a bridge for connecting the NB 221 and peripherals. The ASIC 212 and the NB 221 are connected via an Accelerated Graphics Port (AGP) bus.

The MEM-P 231 is memory connected to the NB 221. The MEM-C 232 is memory connected to ASIC 212. The HDD 233 is a storage device connected to the ASIC 212 for storing image data, document data, programs, font data, and form data, for example.

The NIC 241 is a controller for communicating via a network using MAC addresses, for example. The USB device 242 is a device that provides a serial port in compliance with the USB standard. The IEEE 1394 device 243 is a device that provides a serial port in compliance with the IEEE 1394 standard. The Cenctronics device 244 is a device that provides a parallel port in compliance with the Cenctronics standard. The NIC 241, the USB device 242, the IEEE 1394 device 243, and the Cenctronics device 244 are connected to the NB 221 and the SB 222 via PCI bus.

The memory card slot 251 is a slot connected to the SB 222 in which a memory card 261 is set (inserted). The update memory card slot 252 is a slot connected to SB 222 in which a update memory card 262 for updating programs is set (inserted).

The. operations panel 202 is hardware with which an operator inputs instructions and data to the MFP 101. The MFP 101 uses the operations panel 202 for displaying information related to image forming as well. The operations panel 202 is connected to the ASIC 212. The FCU 203, the image capture unit 121, and the print unit 122 are connected to the ASIC 212 via the PCI bus.

Figure 3:
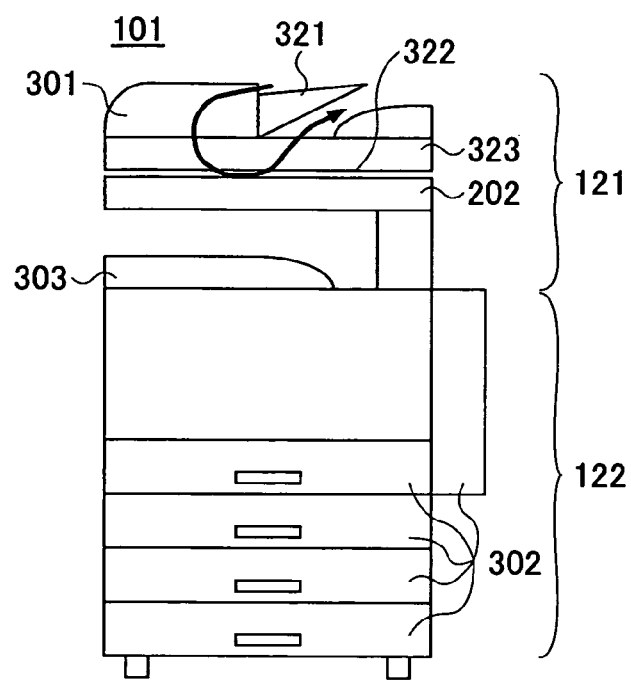
FIG. 3 shows the outside appearance of the MFP shown in FIG. 1.

FIG. 3 shows the appearance of the MFP 101 shown in FIG. 1. The image capture unit 121, the print unit 122, and the operations panel 202 are shown in FIG. 3. A document setting unit 301, a paper feed unit 302, and a discharged paper unit 303 are further shown in FIG. 3. The document setting unit 301 is a unit in which a document is set. The paper feed unit 302 is a unit that feeds paper on which an image is formed by the print unit 122. The discharged paper unit 303 is a unit to which paper is discharged. The document setting unit 301 is a part of the image capture unit 121. The paper feed unit 302 and the discharged paper unit 303 are parts of the print unit 122.

Figure 4:
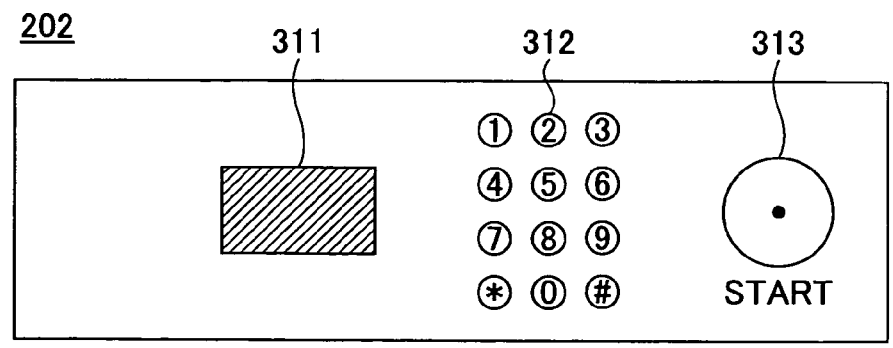
FIG. 4 shows an operations panel according to an embodiment.

The operations panel 202 includes a touch panel 311, numerical buttons 312, and a start button 313 as shown in FIG. 4.

The touch panel 311 is hardware with which an operator presses for inputting instructions and data to the MFP 101. The touch panel 311 is also used by the MFP 101 for displaying information for the operator. The numerical buttons 312 are hardware with which an operator inputs numerals to the MFP 101. The start button 313 is hardware with which an operator causes the MFP 101 to start an operation.

When a document is set in the document setting unit 301, the image capture unit 121 captures an image of the document in response to the pressing of the start button 313. If the MFP 101 operates as a copier, the print unit 122 prints the image on paper. The paper is fed by the paper feed unit 302, and is discharged to the discharged paper unit 303. If the MFP 101 operates as a scanner or a facsimile machine, the NIC 241 transmits the image to another device via a network, for example.

The document setting unit 301 includes an auto document feeder (ADF) 321, a flat bed 322, and a flat bed cover 323.

The ADF 321 is disposed on the top face of the flat bed cover 323. Multiple documents can be set in the ADF 321 at a time. When the documents are set in the ADF 321, the image capture unit 121 captures the images of the documents in response to the pressing of the start button 313. Specifically, when the start button 313 is pressed, the ADF 321 carries the multiple documents one by one through a path indicated by an arrow in FIG. 3. The image capture unit 121 captures the image of each document carried by the ADF 321 through the path.

When the flat bed cover 323 is open, the flat bed 322 is exposed. The flat bed 322 is formed by transparent member such as glass and plastic. A document is set on the flat bed 322 face down. When a document is set on the flat bed 322, the image capture unit 121 captures the image of the document in response to the pressing of the start button 313. Specifically, when the start button 313 is pressed, the image capture unit 121 captures the image of the document opposite the image capture unit 121 via the flat bed 322.

The paper feed unit 302 includes four automatic paper feed trays and one manual paper feed tray. The discharged paper unit 303 includes a discharged paper tray to which paper is discharged.

(MFP Activation Unit)

The MFP activation unit 113 shown in FIG. 1 is described below.

Figure 5:
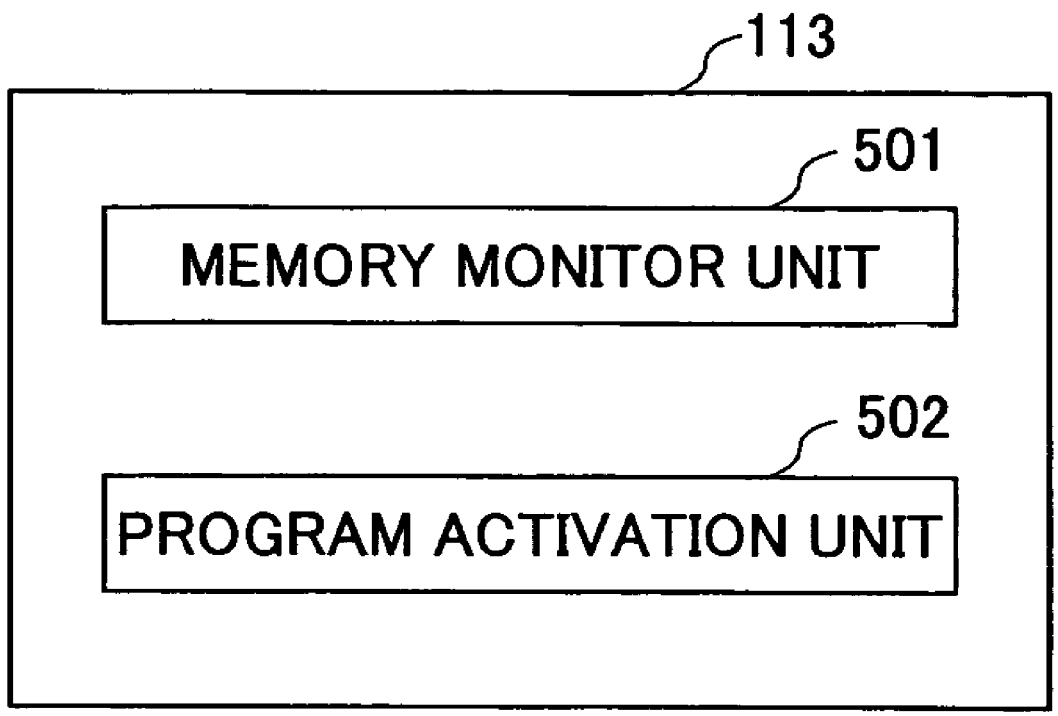
FIG. 5 shows a MFP activation unit according to an embodiment.

The MFP activation unit 113 includes a memory monitor unit 501 and a program activation unit 502 as shown-in FIG. 5.

When the MFP 101 is turned on, BIOS and boot loader of the memory monitor unit 501 are activated, and the BIOS and the boot loader activate the OS such as UNIX (trademark). Then, an activation processing program of the program activation unit 502 is activated, and the activation processing program appropriately activates the application 131 and the platform 132. If UNIX (trademark) is activated, the kernel of UNIX is activated, a root file system is loaded, and a file system related to the application 131 and the platform 132 are mounted on the root file system.

The mounting and activating of the application 131 and the platform 132 are described below. The program activation unit 502 reads a master configuration file "init.conf" in etc of the root directory of UNIX (trademark), and mounts and activates the application 131 and the platform 132 in accordance with a mount command described in the master configuration file. (1) If the mounted file system includes a configuration file "init.conf" and "init.cnf", the program activation unit 502 further reads the configuration file, and performs mounting and activating in accordance with a mount command described in the configuration file. (2) If the mounted file system includes a configuration directory "init.d", the program activation unit 502 reads a configuration file "*.conf" and "*.cnf", and performs mounting and activating in accordance with a mount command described in the configuration file. An authentication file "***.lic" including an electronic signature of the configuration file may be prepared. In such a case, the program activation unit 502 checks the electronic signature of the configuration file before performing mounting and activating in accordance with the mount command described in the configuration file.

The checking of the electronic signature is described below.

As shown in FIG. 6, the memory card 261 stores programs of the application 131 and the platform 132 as mod files, the extensions of which are "*.mod". The memory card 261 also stores the electronic signatures of the mod files, the extensions of which are "*.mac".

As shown in FIG. 6, the memory card 261 further stores the configuration file "*.cnf" as a cnf file, the extension of which is cnf, and stores the authentication file "*.lic" as a lic file, the extension of which is lic.

The electronic signature of a file may be generated by generating a message digest of the file using a hush function such as MD5 and SHA1, and encrypting the message digest in accordance with a secret key. For example, a message digest of the mod file and the cnf file is generated, and is encrypted using a secret key.

The electronic signature of a file may be checked by comparing a message digest generated from the file using the hush function such as MD5 and SHA1 with a message digest obtained by decrypting the electronic signature in accordance with an open key. For example, the authentication of the electronic signature of a mod file and a cnf file can be checked by comparing a message digest generated from the mod file and the cnf file with a message digest obtained by decrypting the electronic signature written in a mac file and a lic file in accordance with an open key. The program activation unit 502 may check the electronic signatures of files as a part of mount processing and activate processing.

If a SD memory card is employed as the memory card 261, an electronic signature may be generated by generating a message digest based on a cnf file and the SD serial ID of the SD memory card and encrypting the message digest using a secret key. Since the SD serial ID is a unique ID of a SD memory card, a lic file stored in the SD memory card becomes unique, which prevents the SD memory card being duplicated. In such a case, the electronic signature of a cnf file can be determined authentic by comparing a message digest generated based on the cnf file and the SD serial ID with a message digest obtained by decrypting the electronic signature written in the lic file using an open key. The SD serial ID is stored in each SD memory card. The mount processing and the activate processing of files stored in the memory card 261 are described with a premise that the SD serial ID is stored in each SD memory card.

Figure 7:
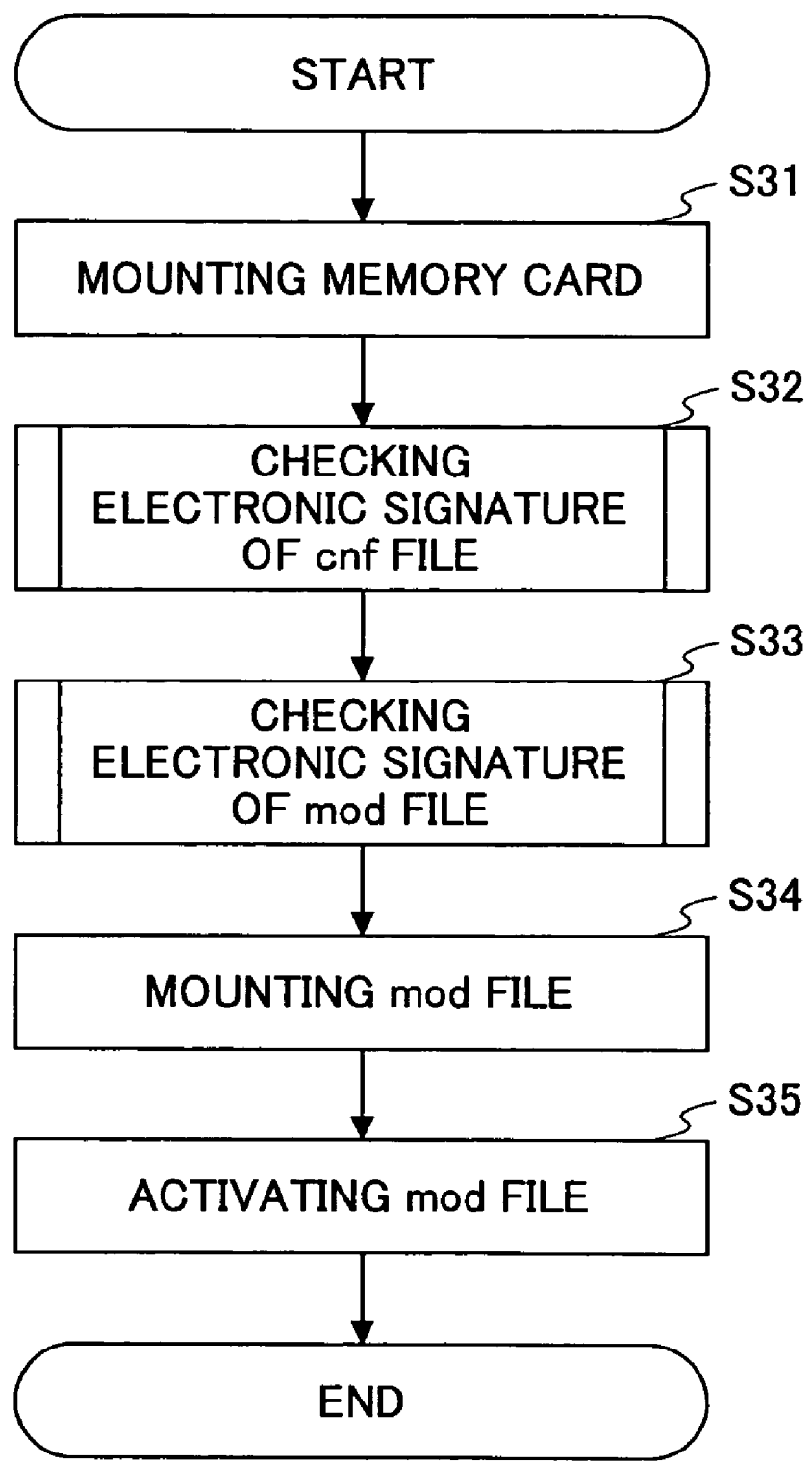
FIG. 7 is a flowchart related to mount processing and activation processing according to an embodiment.

FIG. 7 is a flowchart related to the mount processing and the activate processing of files stored in the memory card.

A memory card 261 inserted in the memory card slot 251 is mounted (S31). The program activation unit 502 checks the electronic signature of each cnf file stored in the memory card 261 (S32). The program activation unit 502 further checks the electronic signature of each mod file stored in the memory card 261 (S33). If the electronic signature of the cnf file related to the mod file and the electronic signature of the mod file are authentic, the program activation unit 502 mounts the mod file (the program of the application 131 and the platform 132) in accordance with a mount command related to the mod file described in the cnf file (S34). Then, the program activation unit 502 activates the mod file (S35).

The operation of the program activation unit 502 is described below more specifically. If there is a cnf file in the memory card 261, the program activation unit 502 checks the electronic signature of the cnf file (S32). For example, if there is "copy.cnf" stored in the memory card 261, the program activation unit 502 checks the electronic signature of the "copy.cnf". If the electronic signature of the cnf file is authentic, the process proceeds to step S33. If there is a mount command in the cnf file, the mount command related to the mod file, the program activation unit 502 checks the electronic signature of the mod file (S33). For example, if there is a mount command "mount gzromfs copy.mod /arch/copy" related to the copy.mod, the program activation unit 502 checks the electronic signature of the copy.mod. If the electronic signature of the copy.mod is authentic, the process proceeds to step S34. Then, the program activation unit 502 mounts the mod file (the program of the application 131 and the platform 132, for example) in accordance with a mount command related to the mod file described in the cnf file (S34), and activates the mod file (S35).

As described above, the mod file stored in the memory card 261 is mounted in accordance with the mount command described in the cnf file of the memory card 261 (S24), and is activated (S35).

Figure 8:
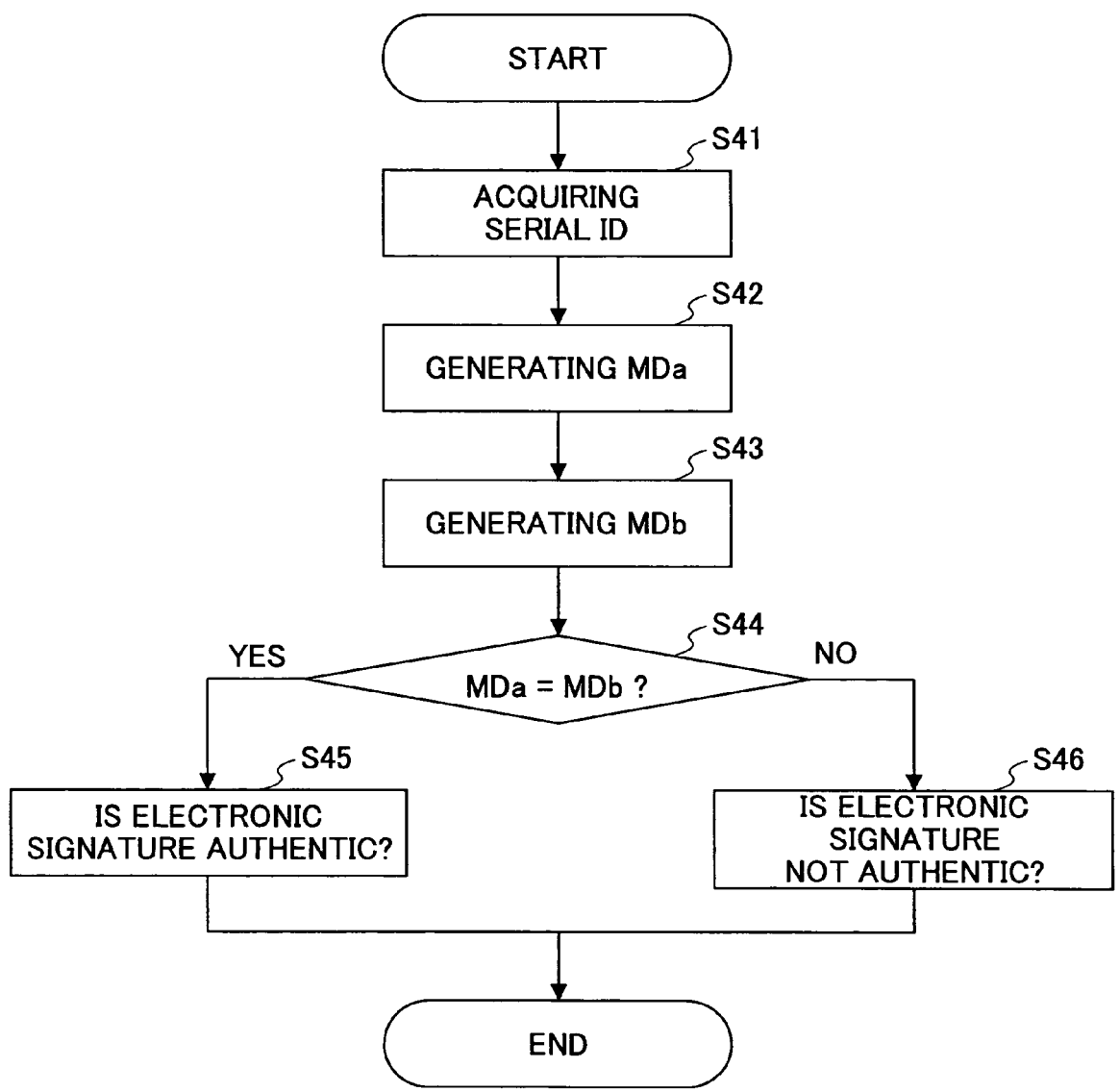
FIG. 8 is a flowchart related to the checking of the electronic signature of a cnf file according to an embodiment.

FIG. 8 is a flowchart related to the checking (S32) of the electronic signature of the cnf file stored in the memory card 261. The program activation unit 502 acquires the serial ID (SD serial ID) from the memory card (SD memory card) 261 (S41). Then, the program activation unit 502 generates a message digest MDa from the cnf file and the serial ID (S42). The program activation unit 502 generates a message digest MDb by decrypting the electronic signature (the message digest generated from the cnf file and the serial ID is encrypted into the electronic signature using a secret key) described in a lic file using an open key. The program activation unit 502 determines whether the electronic signature of the cnf file is authentic by comparing the MDa and the MDb (S44). The program activation unit 502 determines that, if MDa and MDb match, the electronic signature of the cnf file is authentic (S45), and that, if MDa and MDb do not match, the electronic signature of the cnf file is not authentic (S46).

Figure 9:
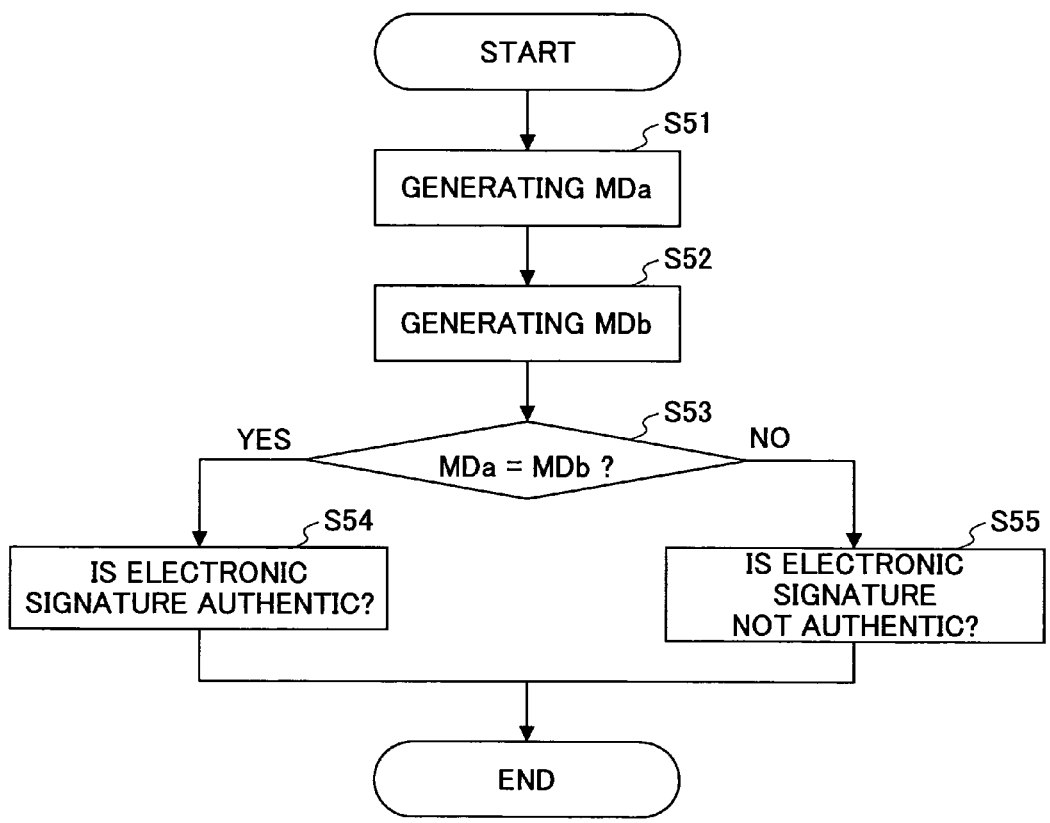
FIG. 9 is a flowchart related to the checking of the electronic signature of a mod file according to an embodiment.

FIG. 9 is a flowchart related to the checking (S33) of the electronic signature of the mod file stored in the memory card 261. The program activation unit 502 generates a message digest MDa from the mod file (S51). The program activation unit 502 generates a message digest MDb by decrypting the electronic signature (the message digest generated from the mod file is encrypted into the electronic signature using a secret key) described in a mac file using an open key (S52). The program activation unit 502 determines whether the electronic signature of the mod file is authentic by comparing the MDa and the MDb (S53). The program activation unit 502 determines that, if MDa and MDb match, the electronic signature of the mod file is authentic (S54), and that, if MDa and MDb do not match, the electronic signature of the mod file is not authentic (S55).

(Memory Card and Update Memory Card)

The memory card slot 251, the update memory card slot 252, the memory card 261, and the update memory card 262 shown in FIG. 2 are described below.

The memory card 261 stores a program of the application 131 and the platform 132. The memory card slot 251 is a slot in which the memory card 261 is set. The application 131 and the platform 132 are stored in the memory card 261 set in the memory card slot 251. When the application 131 and the platform 132 are activated, the application 131 and the platform 132 are retrieved from the memory card 261 set in the memory card slot 251, and loaded to MEM-P 231 and MEM-C 232.

The update memory card 262 stores a new program for updating the program of the application 131 and the platform 132. The update memory card 262 is set in the update memory card slot 252. The MFP 101 shown in FIG. 1 replaces the program stored in the memory card 261 set in the memory card slot 251 with the new program stored in the update memory card 262 set in the update memory card slot 252.

A SD (secure digital) memory card may be used as the memory card 261 and the update memory card 262. The SD memory card is a kind of flash memory cards. A high capacity SD memory card is available at relatively low cost. If the SD memory card is used, a memory card slot that can read and write data in a SD memory card is used as the memory card slot 251 and the update memory card slot 252.

Figure 10:
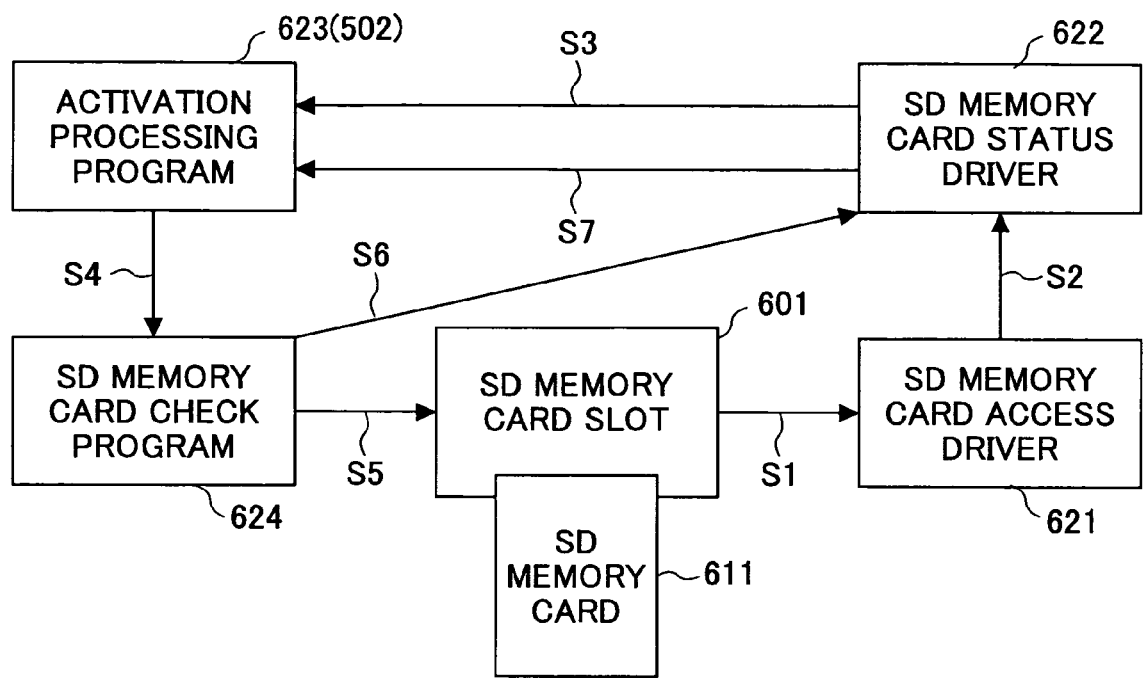
FIG. 10 shows software related to a SD memory card slot and a SD memory card according to an embodiment.

As shown in FIG. 10, the MFP 101 includes software related to the SD memory card slot 601 and the SD memory card 611 such as a SD memory card access driver (SDaccess) 621, a SD memory card states driver (SDstates) 622, an activation processing program 623, and a SD memory card check program (SDcheck) 624.

The SDaccess 621 is a driver that determines whether a SD memory card 611 is set in the SD memory card slot 601 or removed, and controls access to the SD memory card 611. The SDstates 622 is a driver that manages information related to the insertion, removal, mounting, and unmounting of the SD memory card 611. The activation processing program 623 is a program included in the program activation unit 502 shown in FIG. 5. The SDcheck 624 is a program that performs the mounting and unmounting of the SD memory card 611.

When an SD card 611 is inserted into the SD memory card slot 601, the SDaccess 621 determines that the SD memory card 611 is inserted (S1), and informs the SDstates 622 that the SD memory card 611 is inserted (S2). In response to receipt of the information, the SDstates 622 starts managing information that the SD memory card 611 has been inserted, and informs the activation processing program 623 that the SDstates 622 starts managing the information (S3). In response to receipt of the information from the SDstates 622, the activation processing program 623 activates the SDcheck 624 for mounting the SD memory card 611 (S4). The SDcheck 624 mounts the SD memory card 611 (S5), and informs the SDstates 622 that the SDcheck 624 has mounted the SD memory card 611 (S6). In response to receipt of the information from the SDcheck 624, the SDstates 622 starts managing information that the SD memory card 611 has been mounted, and informs the activation processing program 623 that the SDstates 622 starts managing the information (S7).

When the SD memory card 611 is removed from the SD memory card slot 601, the SDaccess 621 determines that the SD memory card 611 has been removed (S1), and informs the SDstates 622 that the SD memory card 611 has been removed (S2). In response to receipt of the information from the SDaccess 621, the SDstates 622 starts managing information that the SD memory card 611 has been removed, and informs the activation processing program 623 that the SDstates 622 has started managing the information (S3). In response to receipt of the information from the SDstates 622, the activation processing program 623 activates the SDcheck 624 for unmounting the SD memory card 611 (S4). The SDcheck 624 unmounts the SD memory card 611 (S5), and informs the SDstates 622 that the SD memory card 611 has been unmounted (S6). In response to receipt of the information from the SDcheck 624, the SDstates 622 starts managing information that the SD memory card 611 has been unmounted, and informs the activation processing program 623 that the SDstates 622 has started managing the information (S7).

A SD memory card can be hot swapped. That is, while the MFP 101 is turned on, the SD memory card 611 can be inserted into and removed from the SD memory card slot 601.

FIRST EMBODIMENT

Figure 11:
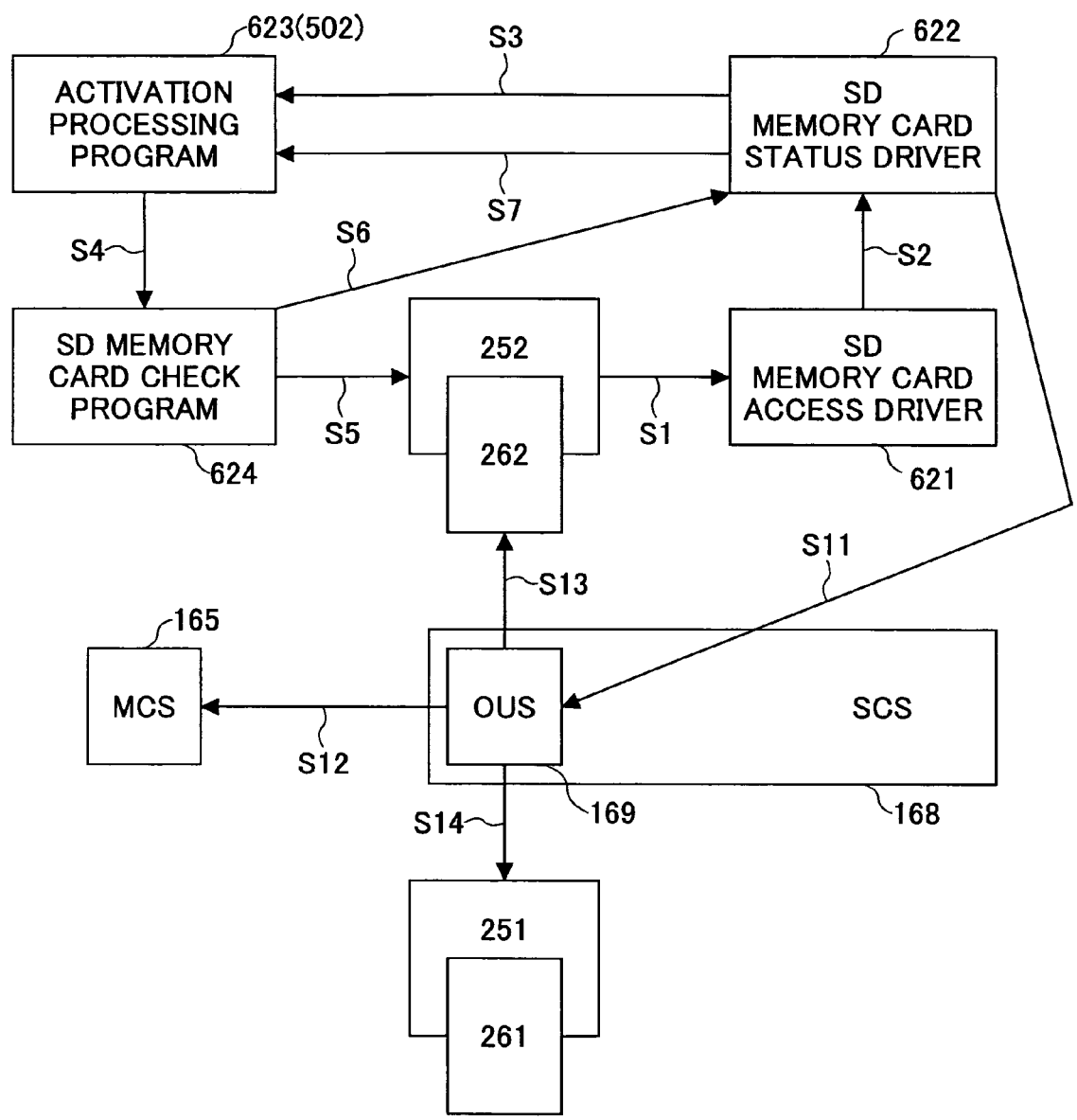
FIG. 11 is a schematic diagram for explaining the operation of the MFP shown in FIG. 1 according to a first embodiment.

The operation of the MFP 101 shown in FIG. 1 according to a first embodiment is described below with reference to FIG. 11.

Figure 12:
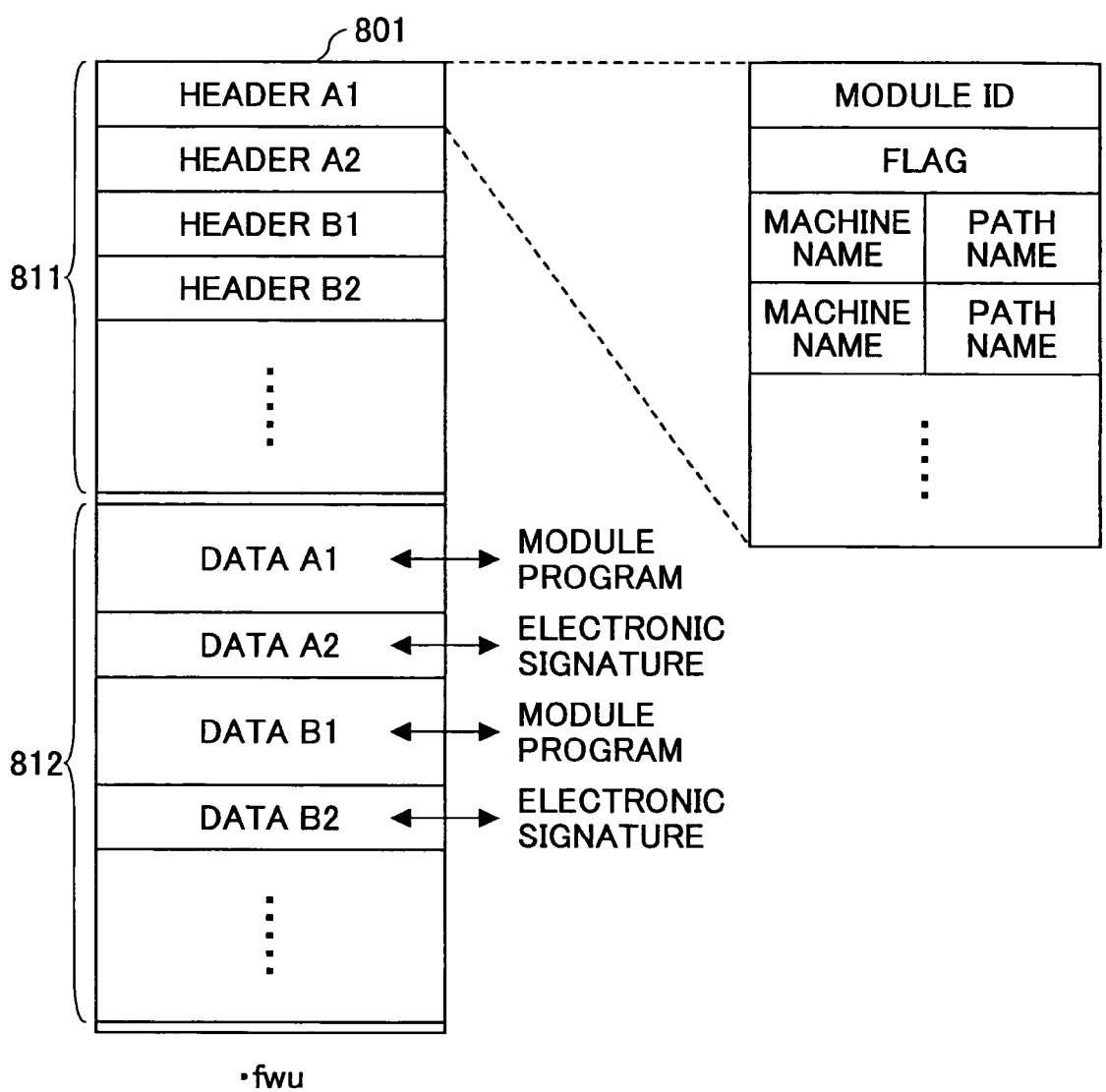
FIG. 12 shows the data structure of data stored in a update memory card according to an embodiment.

As shown in FIG. 12, a new program (update program) for updating an old program of the application 131 and the platform 132 is stored in the update memory card 262 as a fwu file 801 of which extension is "fwu".

The fwu file 801 includes a header portion 811 and a data portion 812. The header portion 811 includes a header A1, a header A2, a header B1, and a header B2, for example. The data portion 812 includes data A1, data A2, data B1, and data B2, for example. The header A1, the header A2, the header B1, and the header B2 are the headers of the data A1, the data A2, the data B1, and the data B2, respectively.

The data A1 and the data B1 are module programs. The module program is a new program for updating a program (module program) included in the application 131 and the platform 132 (modules), for example, such as the copy application 141 and the NCS 161. Programs included in the application 131 and the platform 132 are replaced with new programs by the module. The module programs are converted into binary data, and stored in the update memory card 262.

The data A2 and the data B2 are data corresponding to the electronic signature of the module programs. The module program is converted into a message digest using a hush function such as MD5 and SHA1, and the message digest is encrypted into the electronic signature using a secret key. The data A2 corresponds to the electronic signature of the data A1, and the data B2 corresponds to the electronic signature of the data B1.

Each header A1, A2, B1, and B2 includes the following: a module ID indicating the kind of the module; a flag indicating which, a module program or an electronic signature, the data are; and a machine name and a path name indicating which machine and which directory the new program is to be installed.

FIG. 13 shows exemplary files stored in the update memory card 262. The update memory card 262 shown in FIG. 13 stores three "fwu" files "update_jan_2004.fwu", "update_feb_2004.fwu", and "update_mar_2004.fwu."

As shown in FIG. 14, the memory card 261 stores programs constituting the application 131 and the platform 132 as mod files 901 of which extensions are "mod". The memory card 261 further stores the electronic signatures related to the programs constituting the application 131 and the platform 132 as mac files 902, the extensions of which are "mac".

The mod file 901 is configured by data 911. The data 911 are data corresponding to a module program in the same manner as the data A1 and B1.

The mac file 902 is configured by data 912. The data 912 are data corresponding to the electronic signature related to a module program in the same manner as the data A2 and B2.

FIG. 15 shows exemplary files stored in the memory card 261. The memory card 262 stores mod files "copy.mod", "printer.mod", "network.mod", mac files "copy.mac", "printer.mac", "network.mac", cnf files "copy.cnf", "printer.cnf", "network.cnf", and lic files "copy.lic", "printer.lic", "network.lic", for example.

If the update memory card 262 is inserted into the update memory card slot 252 after the MFP 101 is turned on, SDaccess 621, SDstates 622, the activation processing program 623, and SDcheck 624 perform steps S1 through S7. SDstates 622 informs the on-demand update service (OUS) 169 included in SCS 168 that the update mamory card 262 has been inserted and mounted (S11). In response to receipt of the information from SDstates 622, the OUS 169 acquires memory region via the MCS 165 (S12), and load the fwu file 801 from the inserted update memory card 262 to the memory region (S13).

If the electronic signature related to a module program acquired as the fwu file 801 is authentic, the OUS 169 updates module programs stored as the mod file 901 with the module programs acquired as the fwu file 801 (S14). The determination of whether the electronic signature related to a module program is authentic is made by determining whether a message digest generated from the module program using a hush function such as MD5 and SHA1, and a message digest obtained by decrypting the electronic signature related to the module program using an open key match. If the module program is altered and/or damaged, for example, the two message digests do not match, and a determination is made that the electronic signature related to the module program is not authentic. Accordingly, the module programs acquired as the fwu file 801 is made more reliable.

The OUS 169 further updates module programs stored as the mod file 901 with the module programs acquired as the fwu file 801. The out 169 further update the electronic signatures related to module programs stored as the mac file 902 with the electronic signatures related to the module programs acquired as the fwu file 801. That is, the OUS 169 updates not only a module program but also the electronic signature related to the module program. According to the above arrangement, even after the module program and the electronic signature thereof are updated, a determination can be made of whether the electronic signature related to the module program is authentic, which improves the reliability of the module program.

By the way, because a SD memory card is used as the update memory card 262, the update memory card 262 can be inserted into the update memory card slot 252 even after the MFP 101 is turned on. After the MFP 101 is turned on, if the update memory card 262 is inserted to the update memory card slot 252, the update processing is automatically started, and steps S1 through S7, and steps S1 through S14 are executed. That is, because the SD memory card is used as the update memory card, the MFP 101 can realize on-demand updating.

An exemplary embodiment has been described in which, if the electronic signature of a program acquired from the update memory card 262 is authentic, a program stored in the memory card 261 is updated to the program acquired from the update memory card 262.

According to another embodiment, if the electronic signature of a program acquired from the update memory card 262 is authentic, a program stored in the HDD 233 may be updated to the program acquired from the update memory card 262.

Figure 16:
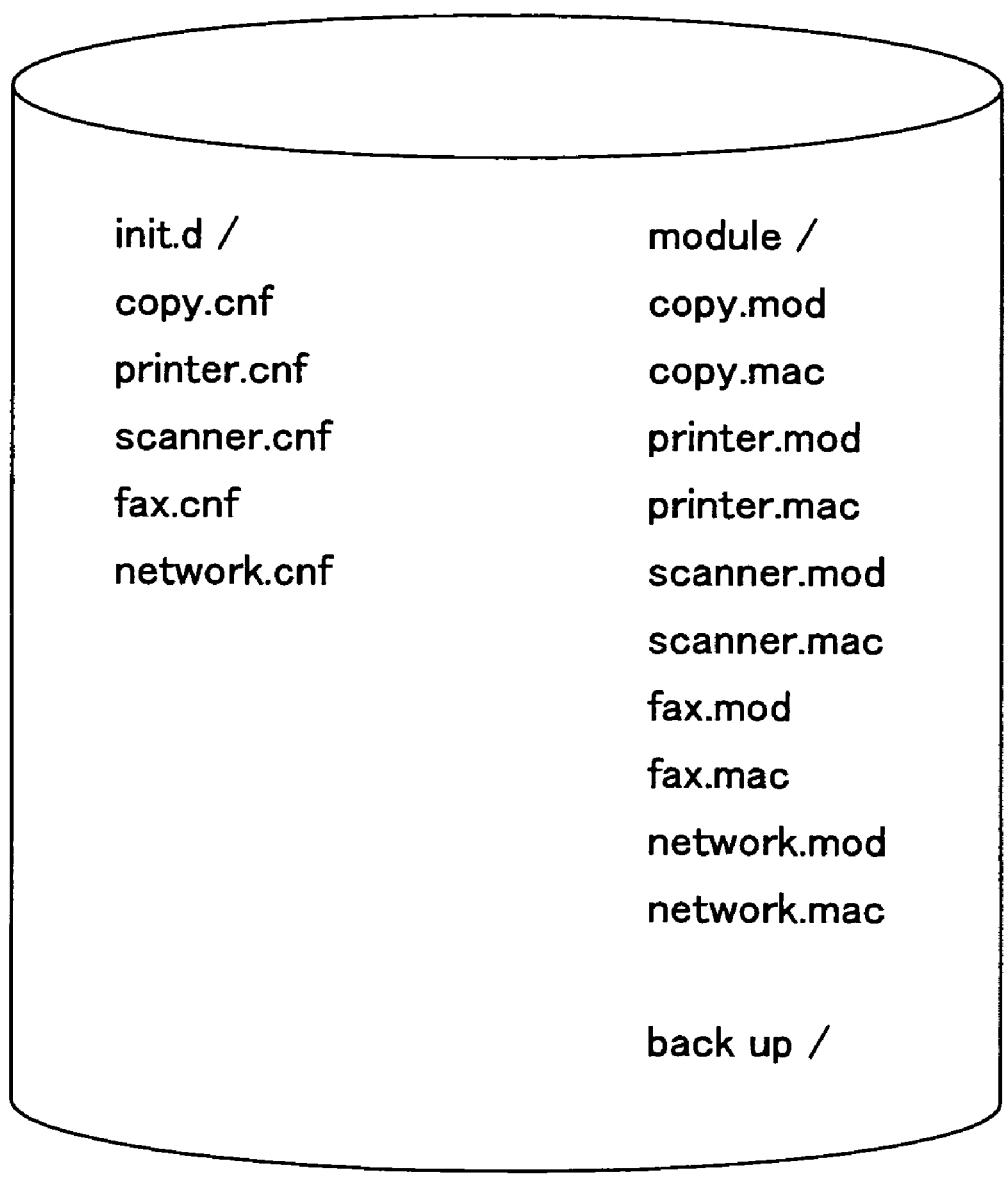
FIG. 16 shows file configuration in a HDD according to an embodiment.

FIG. 16 shows exemplary files stored in the HDD 233. As shown in FIG. 16, the HDD 233 stores mod files "copy.mod", "printer.mod", "network.mod", mac files "copy.mac", "printer.mac", "network.mac", and cnf files "copy.cnf", "printer.cnf", "network.cnf", for example.

Processing performed by the OUS 169 is described below in detail with reference to FIG. 17.

In response to receipt of the information that the update memory card 262 has been inserted and mounted (S11), the OUS 169 acquires a memory region via the MCS 165 (S12), and analyzes the header portion 811 of the fwu file 801 stored in the update memory card 262 (S101). Then, the OUS 169 determines whether the electronic signature related to the module programs stored as the fwu file 801 are authentic (S102). The module programs of which electronic signature is determined to be not authentic are displayed on the touch panel 311 as error modules (S103). The module programs of which electronic signature is determined to be authentic are displayed on the touch panel 311 via the OCS 166 as updating modules (S104).

When the updating module is selected by pressing the touch panel 311 (S105), the OUS 169 acquires the fwu file 801 from the update memory card 262 and loads the fwu file 801 in the memory region (S13), and analyzes the header portion 811 of the fwu file 801 acquired from the update memory card 262 (S106). Subsequently, the OUS 169 determines whether the electronic signature related to the module programs acquired as the fwu file 801 is authentic (S107). If the electronic signature of the module programs is determined to be not authentic, the OUS 169 displays the module programs on the touch panel 311 via the OCS 166 as error modules (S108). If the electronic signature of the module programs is determined to be authentic, the OUS 169 updates module programs stored as the mod file 901 with the module programs acquired as the fwu file 801 (S14).

Figure 18:
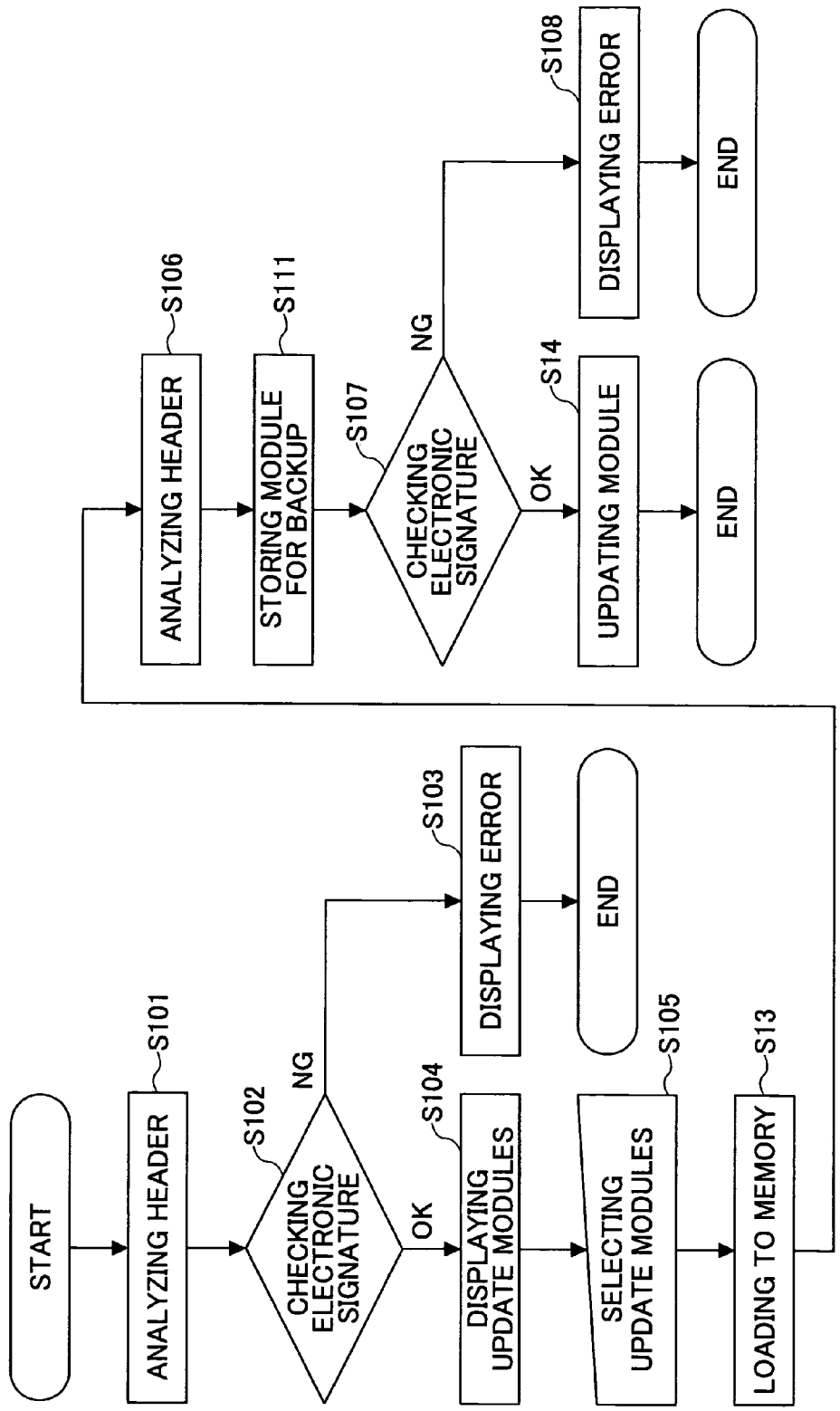
FIG. 18 is a flowchart related to the operation of the OUS according to an embodiment.

As shown in FIG. 18, before a determination is made of whether the electronic signature related to the module programs acquired as the fwu file 801 is authentic (S107), the module programs stored as the mod file 901 may be backed up (S111). In such a case, the module programs stored as the mod file 901 are backed up, and then, are updated with the module programs acquired as the fwu file 801 (S14). Even if update processing fails, the MFP 101 can operate with the backed-up module programs.

Figure 19:
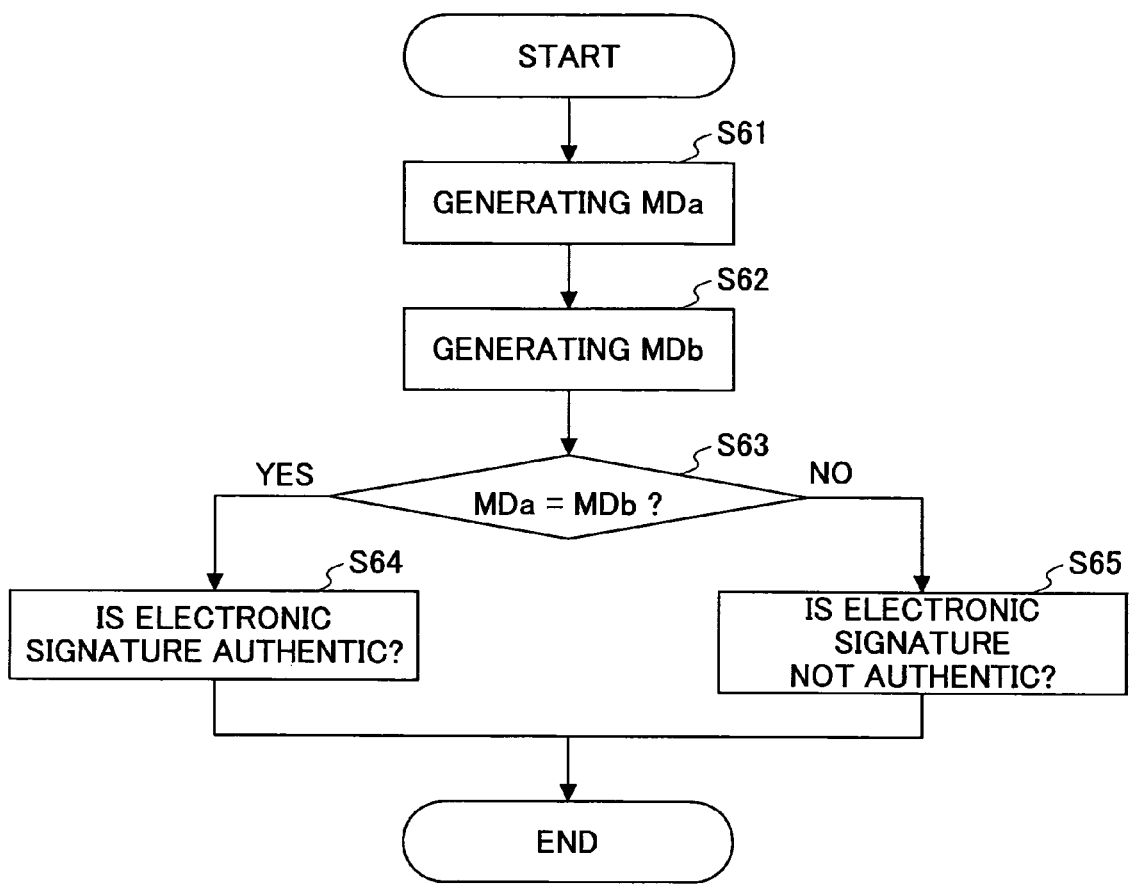
FIG. 19 is a flowchart related to the checking of the electronic signature of a module program according to an embodiment.

FIG. 19 is a flowchart related to the checking of the electronic signature of module programs (S102, S107). The OUS 169 generates a message digest MDa from the module program (S61). The OUS 169 generates a message digest MDb by decrypting the electronic signature (the message digest generated from the module program is encrypted into the electronic signature using a secret key) related to the module program using an open key (S62). The OUS 169 determines whether the electronic signature of the module program is authentic by comparing the MDa and the MDb (S63). The OUS 169 determines that, if MDa and MDb match, the electronic signature of the module program is authentic (S64), and that, if MDa and MDb do not match, the electronic signature of the module program is not authentic (S65).

SECOND EMBODIMENT

Figure 20:
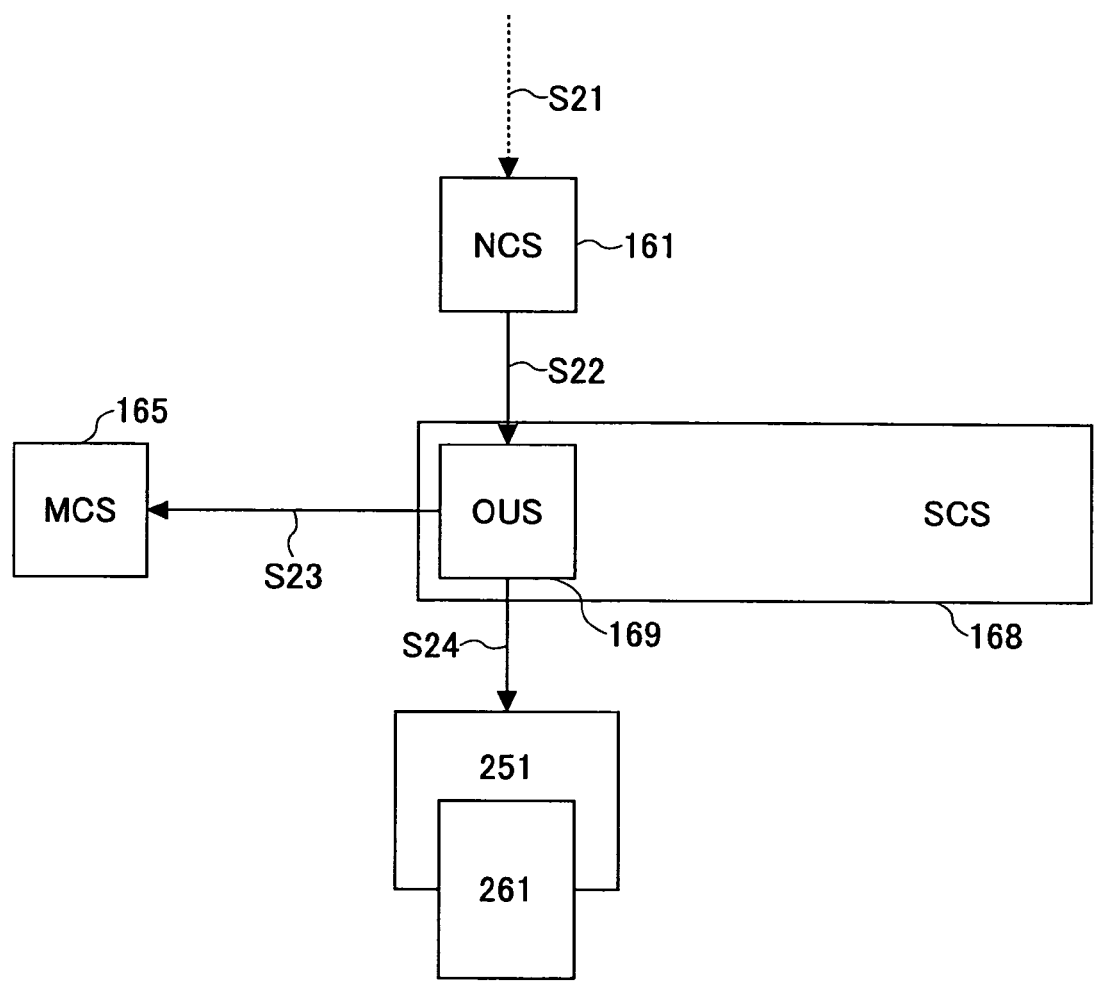
FIG. 20 is a schematic diagram for explaining the operation of the MFP shown in FIG. 1 according to a second embodiment.

The operation of the MFP 101 shown in FIG. 1 according to a second embodiment is described below with reference to FIG. 20.

After the MFP 101 is turned on, the NIC 241, for example, receives the fwu file 801 as shown in FIG. 12 from another device (for example, a personal computer in which a driver of the MFP 101 is installed) via a network, for example. In such a case, if the NCS 161 determines that the fwu file 801 has been received by the NIC 241 (S21), the NCS 161 provides the fwu file 801 to the on-demand update service (OUS) 169 included in the SCS 168 (S22). In response to receipt of the fwu file 801, the OUS 169 acquires a memory region via the MCS 165, and loads the fwu file 801 to the memory region (S23).

If the electronic signature of the module programs provided as the fwu file 801 is authentic, the OUS 169 updates module programs stored as the mod file 901 with the module programs provided as the fwu file 801 (S24).

The OUS 169 further updates the electronic signature related to the module programs stored as the mac file 902 with the electronic signature related to the module programs provided as the fwu file 801. An exemplary embodiment has been described in which, if the electronic signature of the program received by the NIC 241, for example, is authentic, program stored in the memory card 261 is updated with the program received by the NIC 241. According to another embodiment, if the electronic signature of the program received by the NIC 241, for example, is authentic, program stored in the HDD 233 may be updated with the program received by the NIC 241.

Figure 17:
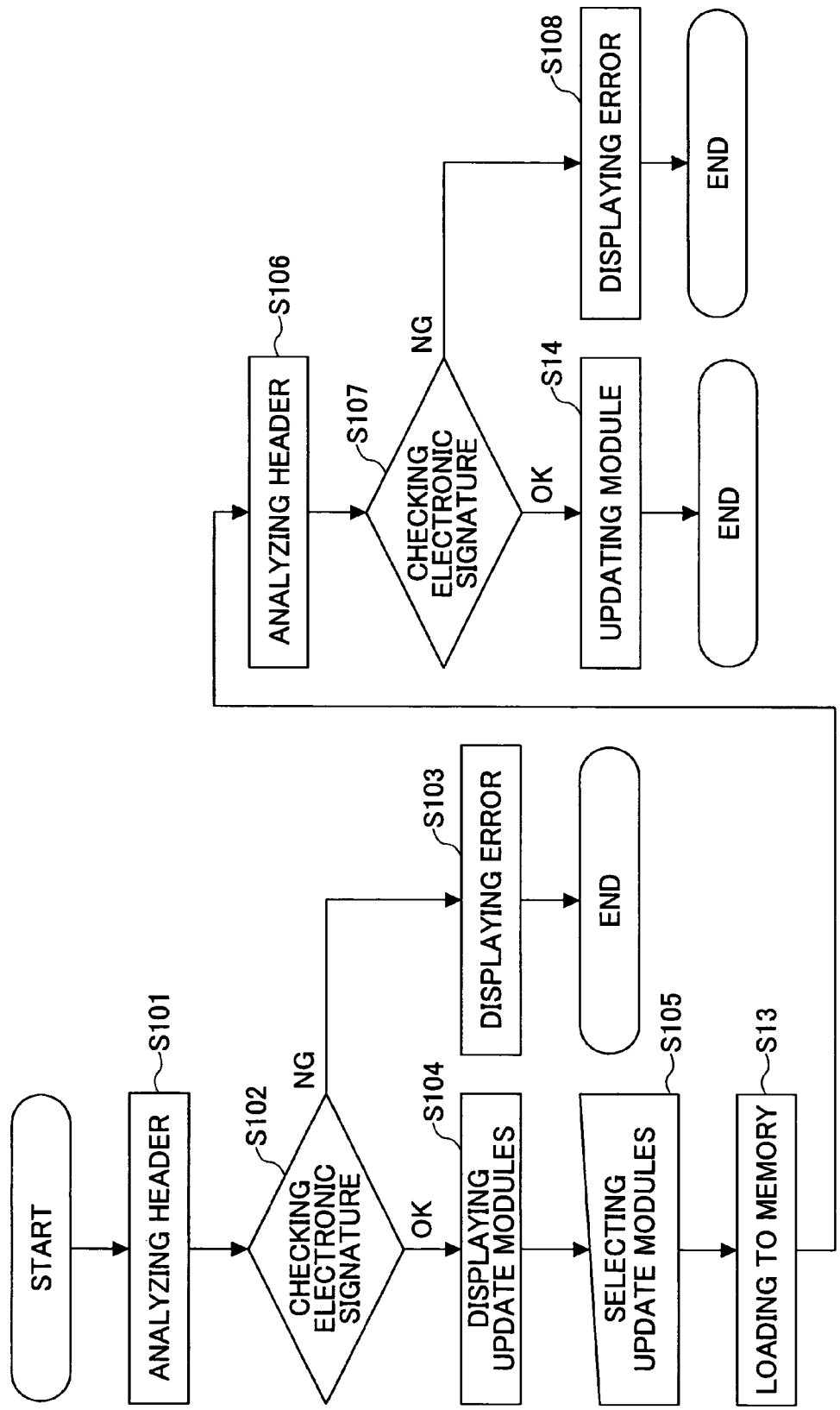
FIG. 17 is a flowchart related to the operation of OUS according to an embodiment.

The operation of the OUS 169 is almost the same as those shown in FIGS. 17, 18, and 19. Steps S11, S12, S13, and S14 are replaced with steps S21, S22, S23, and S24, respectively.

[Variations]

A description is given about the case in which multiple fwu files 801 are stored in the update memory card 262 as variations of FIGS. 17 and 18.

Figure 21:
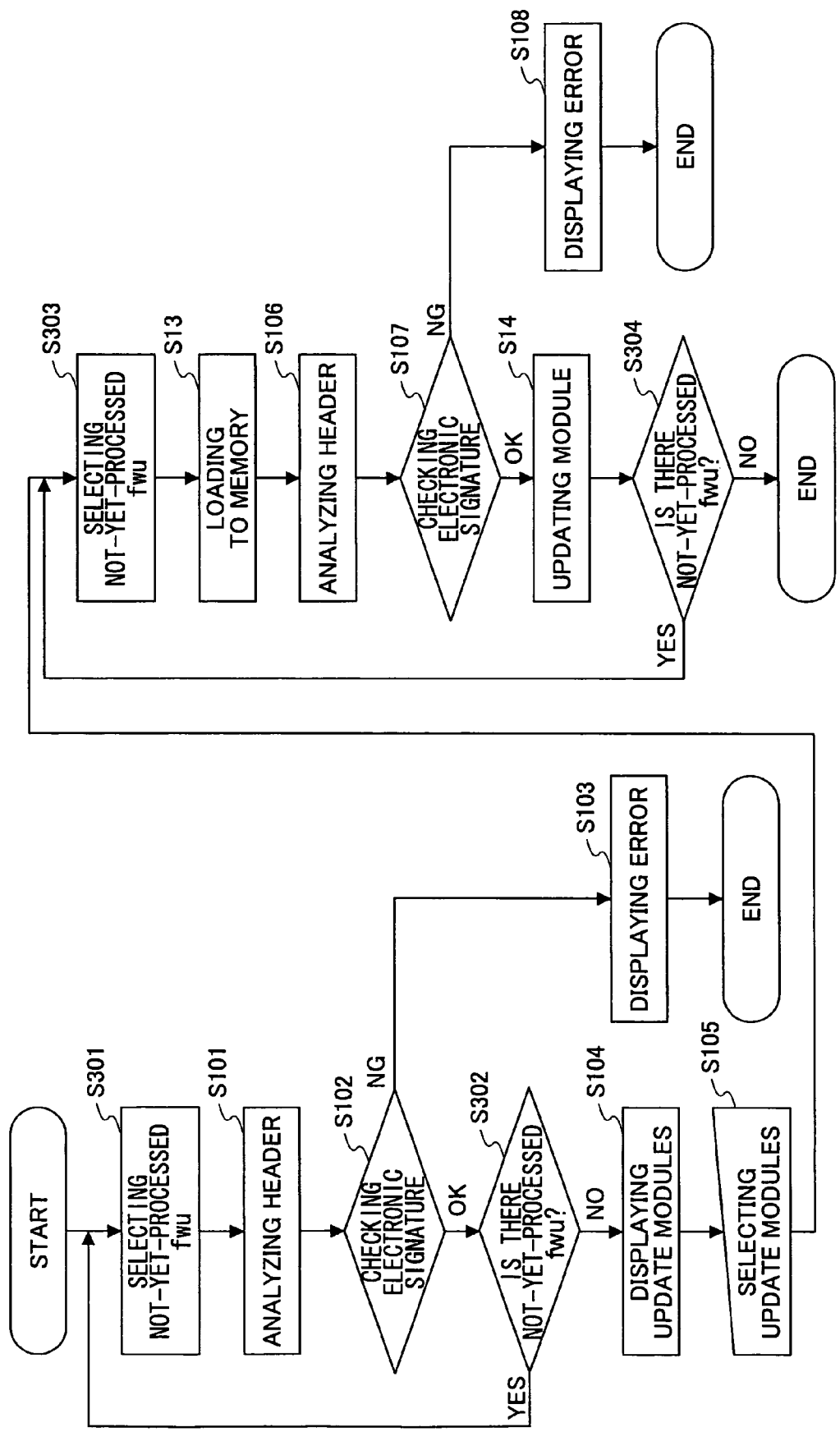
FIG. 21 is a flowchart corresponding to a variation of FIG. 17.

FIG. 21 is a flowchart corresponding to a variation of FIG. 17.

In response to receipt of information that the update memory card 262 has been inserted and mounted (S11), the OUS 169 acquires a memory region via the MCS 165 (S12) and selects a fwu file 801 that has not yet been processed from the fwu files 801 stored in the update memory card 262 (S301). The OUS 169 analyzes the header portion 811 of the fwu file 801 (S101). Then, the OUS 169 determines whether the electronic signature related to the module programs stored as the fwu file 801 are authentic (S102). If there is a module program of which electronic signature is determined to be not authentic, the OUS 169 indicates on the touch panel 311 that there is an error module (S103). If there is not module program of which electronic signature is determined to be not authentic, and if there is a not-yet-processed fwu file 801 in the update memory card 262 (S302), the process returns to S301. If there is not a not-yet-processed fwu file 801 in the update memory card 262, the process proceeds to S104. In step S104, the module programs of which electronic signature is determined to be authentic is indicated on the touch panel 311 via the OCS 166 as updating modules (S104).

When the updating module is selected by pressing the touch panel 311 (S105), the OUS 169 selects a not-yet-processed fwu file 801 from the fwu files 801 that are updating (S303). The OUS 169 acquires the fwu file 801 from the update memory card 262 and loads the fwu file 801 in a memory region (S13). The out 169 analyzes the header portion 811 of the fwu file 801 (S106). Subsequently, the OUS 169 determines whether the electronic signature related to each module program acquired as the fwu file 801 is authentic (S107). If there is a module program of which electronic signature is determined to be not authentic, the OUS 169 indicates that there is an error module on the touch panel 311 via the OCS 166 (S108). If there is no module program of which electronic signature is determined to be not authentic, and if there is not-yet-processed fwu file 801 in the fwu files 801 that are updating (S304), the process returns to step S303. If there is a not-yet-processed fwu file 801 in the fwu files 801 that are updating (S304), the process proceeds to step S14. In step S14, the OUS 169 updates module programs stored as the mod file 901, with the module programs acquired as the fwu file 801 of which electronic signature is determined to be authentic (S14).

[Details of Flowcharts]

Flowcharts shown in FIGS. 17, 18, and their variations are described in detail.

Figure 22:
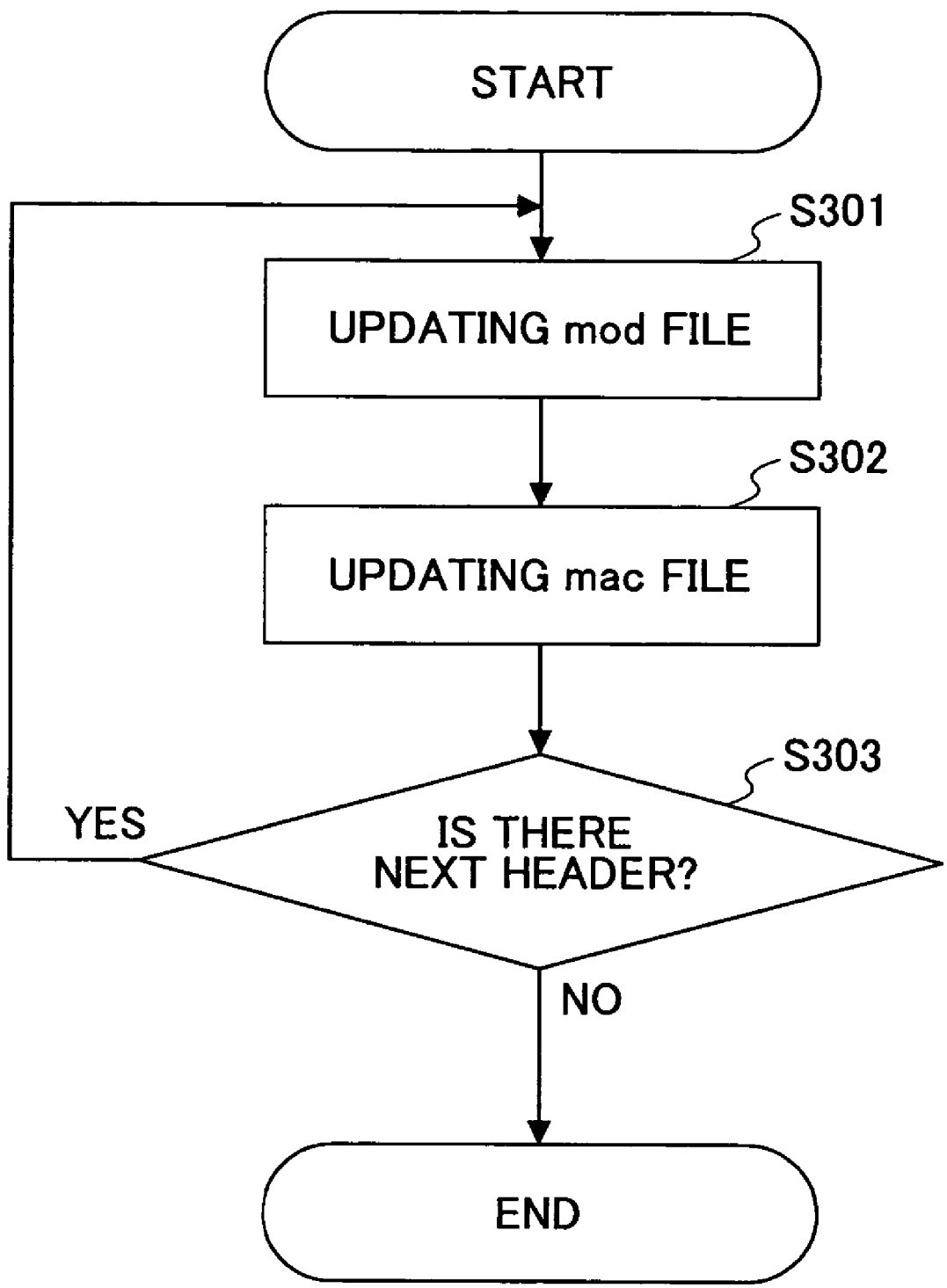
FIG. 22 is a flowchart related to the updating of a module according to an embodiment.

FIG. 22 is a flowchart related to the updating of a module (S14).

The OUS 169 updates the mod file 901 in a module directory (see FIG. 15) based on the path name acquired by the analyzing (S106) of a header (S301). Then, the OUS 169 updates the mac file 902 in the module director (see FIG. 15) based on the path name acquired by the analyzing (S106) of the header (S302) The OUS 169 repeats steps S301 and S302 for each header (S303).

Figure 23:
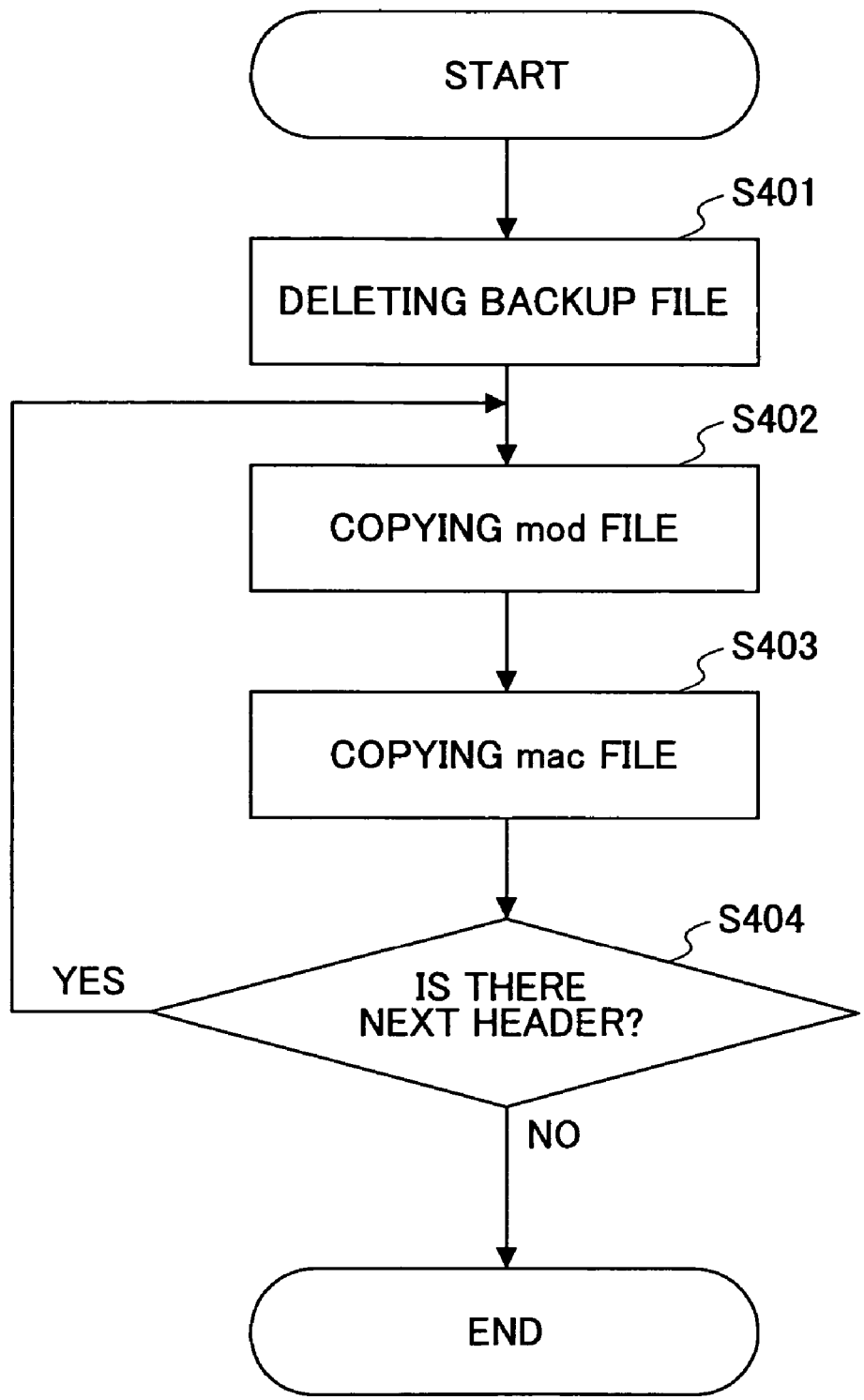
FIG. 23 is a flowchart related to backup processing according to an embodiment.

FIG. 23 is a flowchart related to back-up processing (S111).

The OUS 169 deletes a backup file if a backup director (see FIG. 15) (S401). The OUS 169 copies the mod file 901 in the module directory (see FIG. 15) to the backup directory based on the path name acquired by the analyzing (S106) of the header (S402). The OUS 169 then copies the mac file 902 in the module directory (see FIG. 15) to the backup directory based on the path name acquired by the analyzing (S106) of the header (S403). The OUS 169 repeats steps S402 and S403 for each header (S404).

[Other Variations]

A description is given about a variation of the operation of the MFP 101 in which the electronic signature of each module program is checked after the module program is updated.

Figure 24:
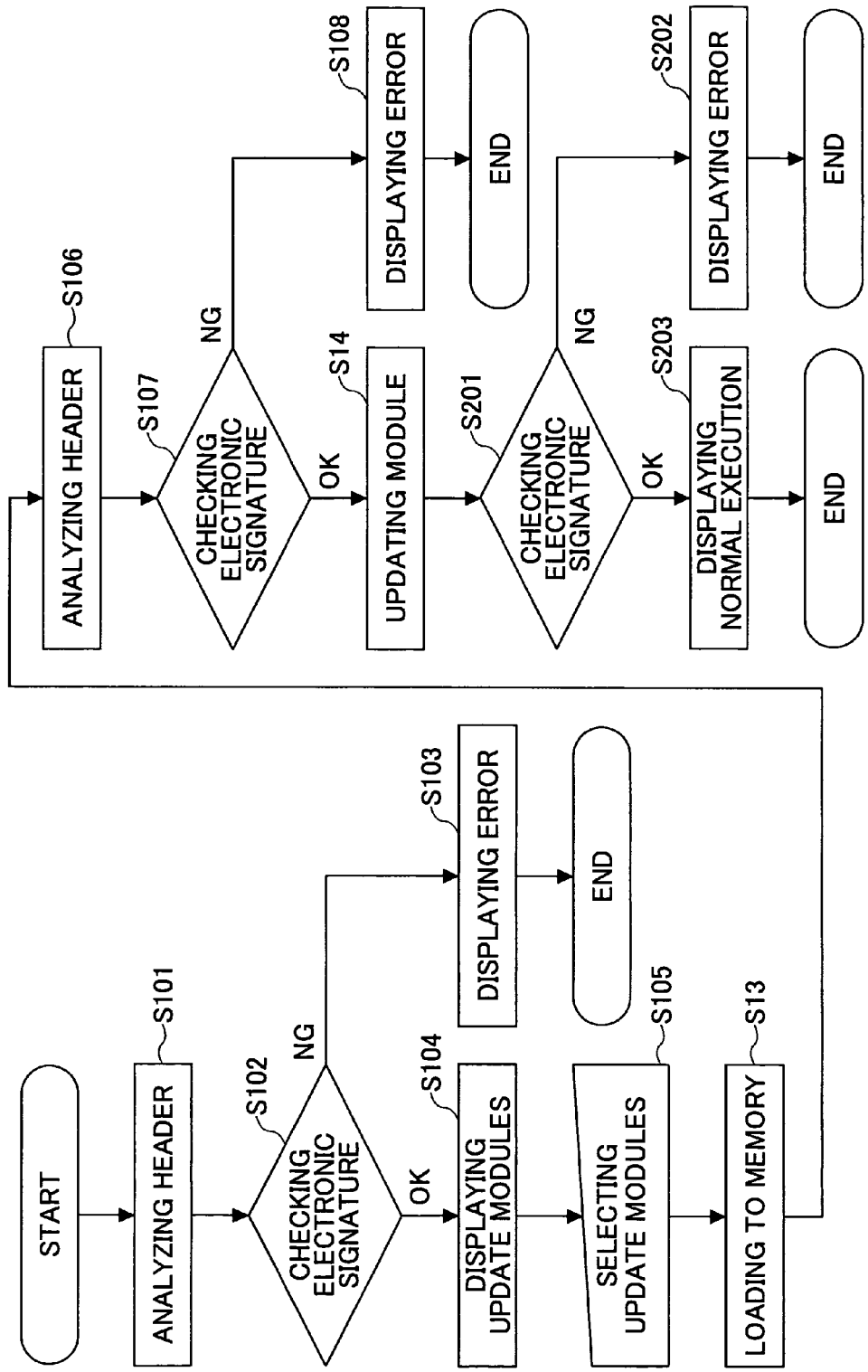
FIG. 24 is a flowchart corresponding to a variation of FIG. 17.

FIG. 24 is a flowchart corresponding to a variation of FIG. 17.

The OUS 169 update each module program stored as the mod file 901 with the module program acquired as the fwu file 801 (S14), and determines whether the electronic signature (updated mac file) related to each updated module program (updated mod file) is authentic (S201). If a module program is determined to be not authentic, the OUS 169 indicates the module program on the touch panel 311 via the OCS 166 as an error module (S202). If a module program is determined to be authentic, the OUS 169 indicates that the module program has been normally updated on the touch panel 311 via the OCS 166 (S203), and ends update processing of the module program normally.

As shown in FIG. 24, after updating the module program, the OUS 169 determines whether the electronic signature of the module program is authentic, and ends update processing of the module program. If the electronic signature related to the module program is determined to be authentic, the updating of the module program is regarded as being completed normally.

Figure 25:
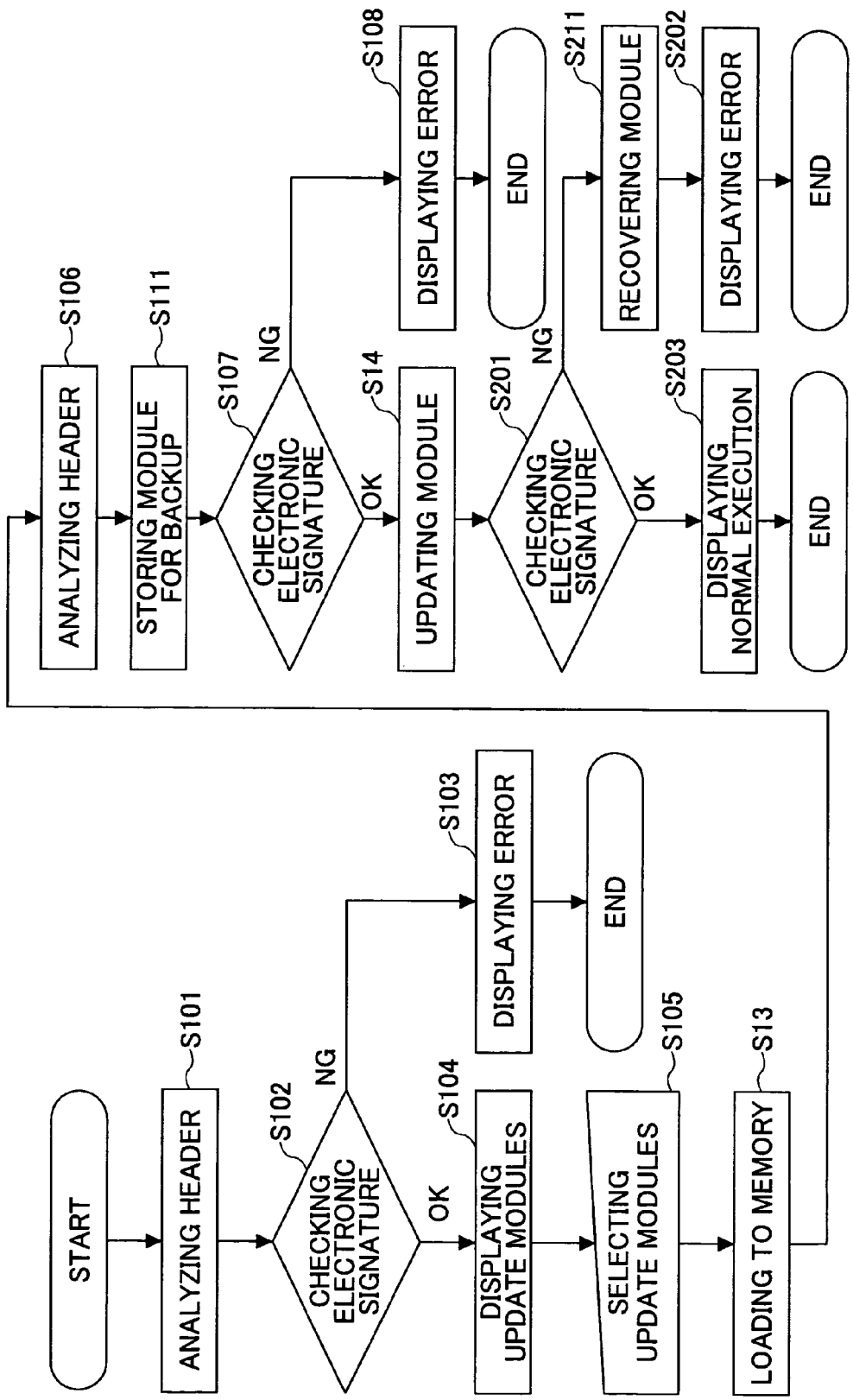
FIG. 25 is a flowchart corresponding to a variation of FIG. 18.

FIG. 25 is a flowchart corresponding to FIG. 18.

The OUS 169 updates each module program stored as the mod file 901 with the module programs acquired as the fwu file 801 (S14), and determines whether the electronic signature (updated mac file) related to each module program (updated mod file) is authentic (S201). If the electronic signature of a module program is determined to be not authentic, the OUS 169 recovers the module program with the backed-up module program (S211), and indicates the module program as an error module on the touch panel via the OCS 166 (S202). If the electronic signature of a module program is determined to be authentic, the OUS 169 indicates that update processing of the module program has been normally completed on the touch panel 311 via the OCS 166 (S203), and ends update processing of the module program.

As shown in FIG. 25, the OUS 169 updates a module program, and then, determines whether the electronic signature of the updated module program is authentic. If the OUS 169 determines that the electronic signature of the updated module program is not authentic, the OUS 169 restores the backed-up module program for recovery. The module program of which electronic signature is determined to be not authentic is restored with the backed-up module program. Even if update processing fails, the MFP 101 can operate using the backed-up module program.

Figure 26:
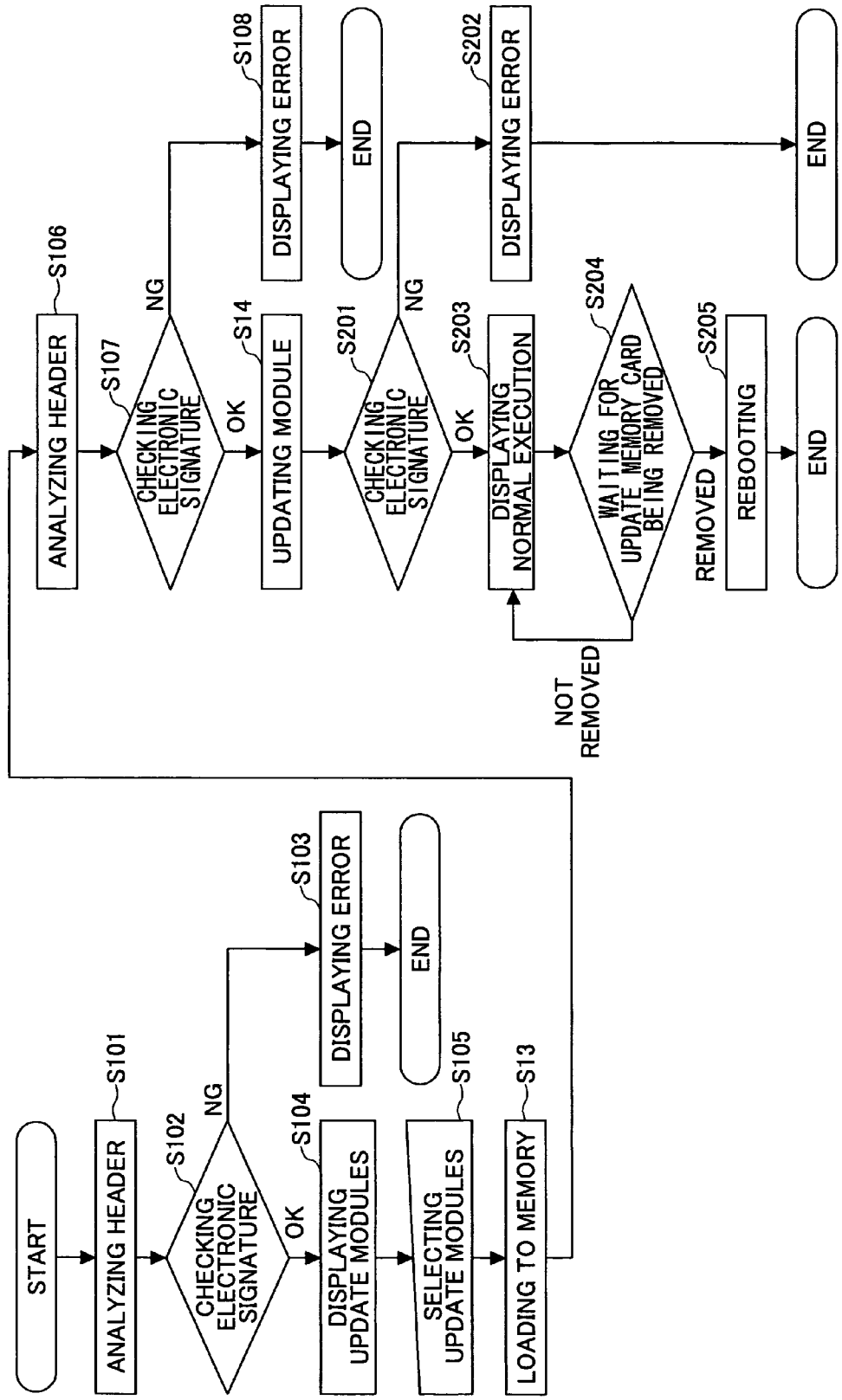
FIG. 26 is a flowchart corresponding to another variation of FIG. 17.

FIG. 26 is a flowchart corresponding to another variation of FIG. 17. Process shown in FIG. 26 is applicable to the operation of the MFP 101 according to the first embodiment described above.

The OUS 169 updates each module program stored as the mod file 901 with the module programs acquired as the fwu file 801 (S14), and determines whether the electronic signature (updated mac file) related to each updated module program (updated mod file) is authentic (S201). A module program of which electronic signature is determined to be not authentic is indicated on the touch panel 311 via the OCS 166 as an error module (S202). If the electronic signature of a module program is determined to be authentic, the OUS 169 indicates that update processing of the module program has been normally completed (S203), and ends update processing of the module program normally. When update processing ends, the MFP 101 indicates that the update memory card 262 can be removed from the update memory card slot, and waits for the update memory card 262 being removed (S204). When the update memory card 262 is removed and unmounted, the MFP 101 is automatically restarted (rebooted) (S205). As a result, the updated module program is mounted and activated.

Backup processing (S111) shown in FIG. 18 and recovery processing (S211) shown in FIG. 22 may be included in the operation of the MFP 101 shown in FIG. 26.

Figure 27:
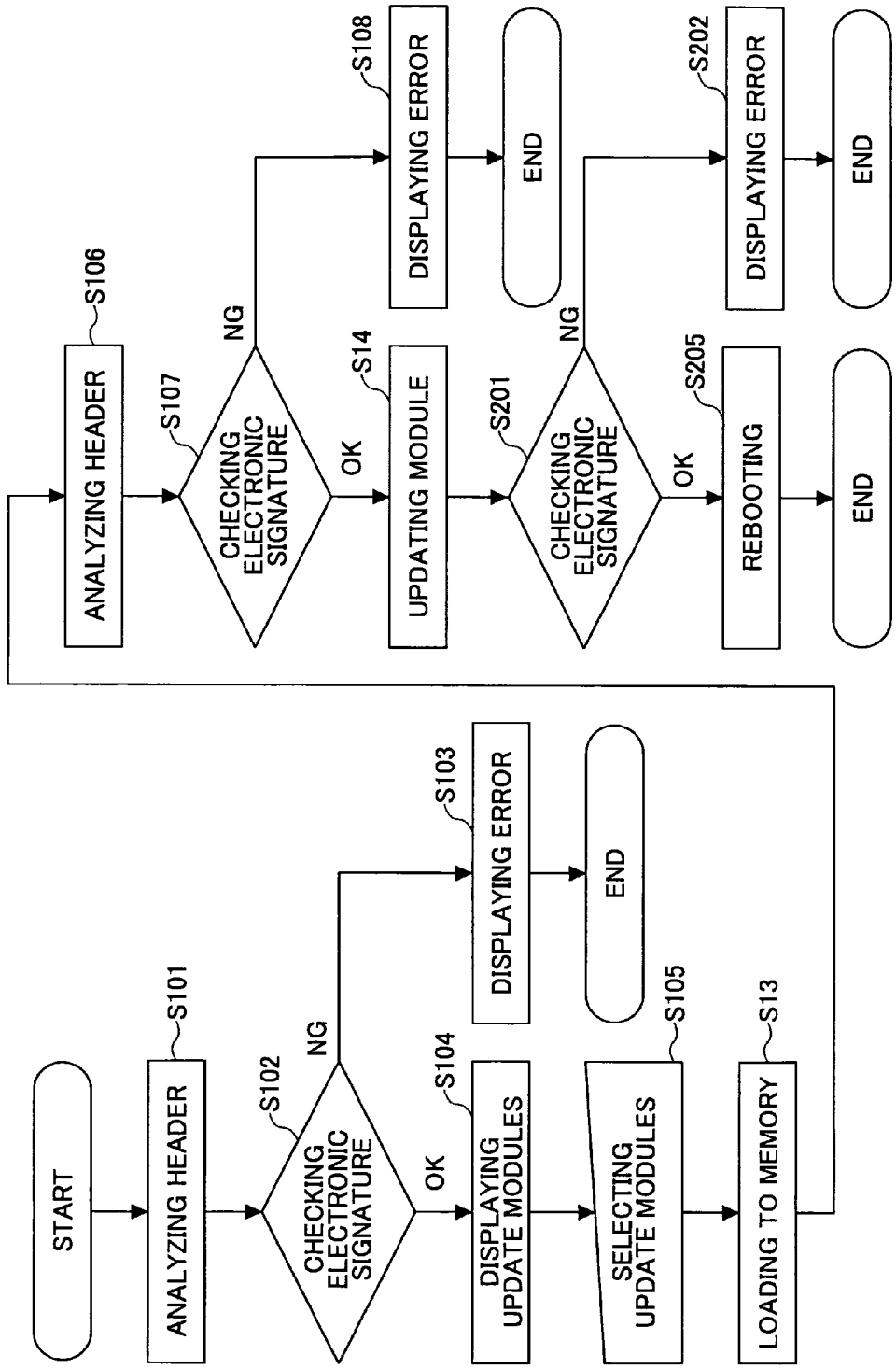
FIG. 27 is a flowchart corresponding to another variation of FIG. 17.

FIG. 27 is a flowchart corresponding to a variation of FIG. 17. Processing shown in FIG. 27 is applicable to the operation of the MFP 101 according to the second embodiment.

The OUS 169 updates each module program stored as the mod file 901 with the module programs acquired as the fwu file 801 (S14), and determines whether the electronic signature (updated mac file) related to each updated module program (updated mod file) is authentic (S201). A module program of which electronic signature is determined to be not authentic is indicated on the touch panel 311 via the OCS 166 as an error module (S202). If the OUS 169 determines that the electronic signature of the module program is authentic, the OUS 169 normally ends update processing of the module program. In response to the completion of update processing, the MFP 101 is. automatically restarted (rebooted) (S205). The updated module program is mounted and activated.

Backup processing (S111) shown in FIG. 18 and recovery processing (S211) shown in FIG. 22 may be executed as a part of the operation of MFP 101 shown in FIG. 27.

An exemplary embodiment has been described with reference to FIG. 21 in which there are multiple fwu files 801 in the update memory card 262. According to another embodiment, the checking of the electronic signature (S201) shown in FIG. 24 and reboot processing (S205) shown in FIG. 26 may be executed as a part of the operation of the MFP 101 shown in FIG. 21.

Figure 28:
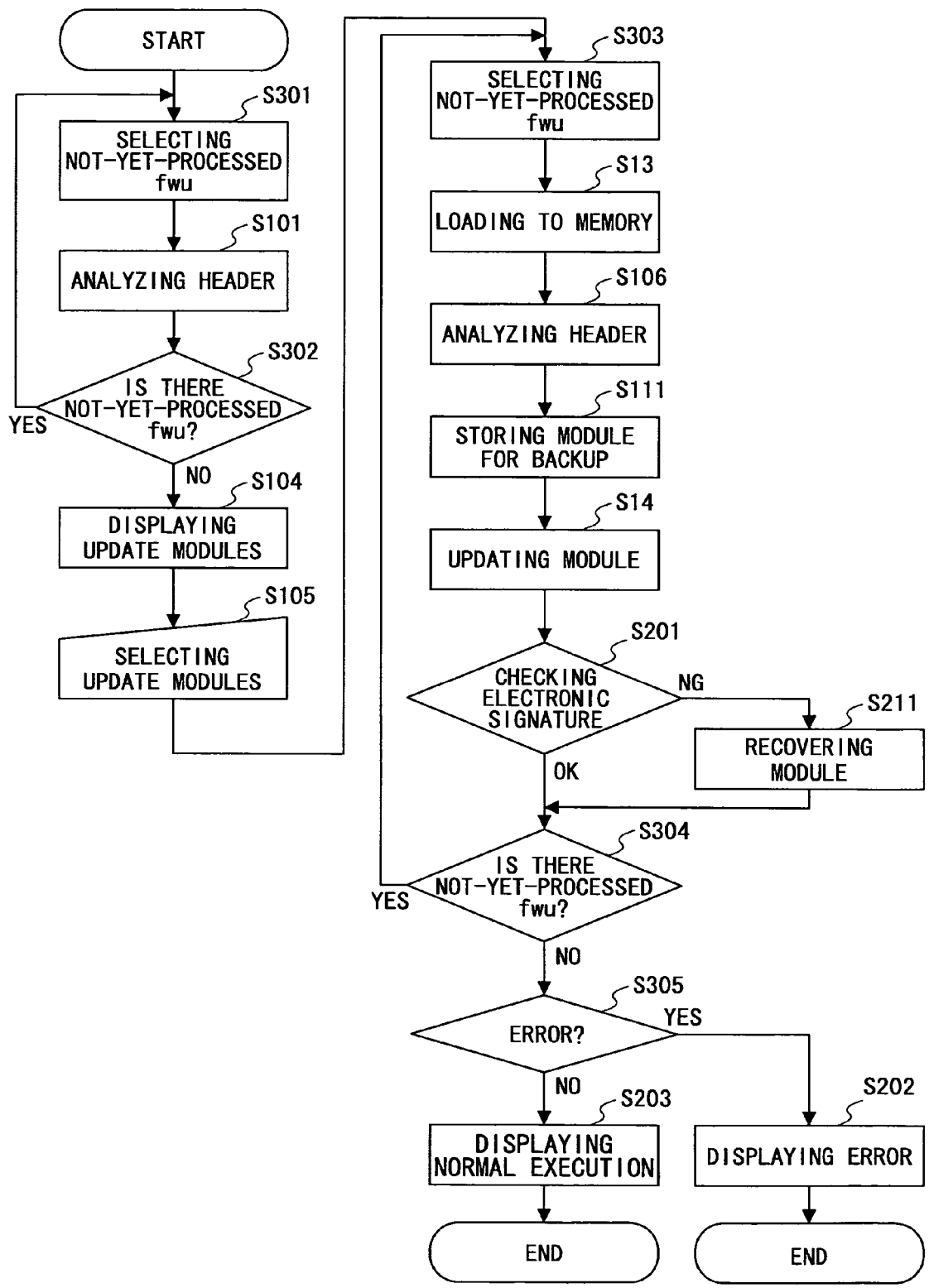
FIG. 28 is a flowchart corresponding to another variation of FIG. 18.

FIG. 28 is a flowchart corresponding to an variation of FIG. 18.

In response to receipt of information that the update memory card 262 has been inserted and mounted, the OUS 169 acquires a memory region via the MCS 165 (S12), selects a not-yet-processed fwu file 801 from the multiple fwu files 801 stored in the update memory card 262 (S301). The OUS 169 analyzes the header portion 811 of the fwu file 801 (S101). If there is a not-yet-processed fwu file 801 in the update memory card 262 (S302), the process returns to S301. If there is not a not-yet-processed fwu file 801 in the update memory card 262 (S302), the process proceeds to S104. In step S104, the fwu files 801 that are updating are indicated on the touch panel 311 via the OCS 166 (S104).

When the updating module is selected by pressing the touch panel 311 (S105), the OUS 169 selects a not-yet-processed fwu file 801 from the fwu files 801 that are updating (S303). The OUS 169 acquires the fwu file 801 from the update memory card 262 and loads the fwu file 801 in a memory region (S13). The out 169 analyzes the header portion 811 of the fwu file 801 (S106). Subsequently, the OUS 169 makes a backup of the mod file 901 to be updated by the fwu file 801 (S111). Then, the module program stored as the mod file 901 is updated with the module program acquired as the fwu file 801 (S14).

The OUS 169 updates each module program stored as the mod file 901 with the module programs acquired as the fwu file 801 (S14), and determines whether the electronic signature (updated mac file) related to each updated module program (updated mod file) is authentic (S201). If there is a module program of which electronic signature is determined to be not authentic, the OUS 169 restores the module program that has been retained as a backup (S211). If there is no module program of which electronic signature is determined to be not authentic, and there is a not-yet-processed one of the fwu files 801 that are updating (S304), the process returns to S303. If there is no not-yet-processed fwu file 801 that are updating (S304), the process proceeds to S305. In step S305, the OUS 169 determines whether there is a module program that has been determined to be not authentic (S305). If a determination is made that there is a unauthentic module program, the OUS 169 indicates that there is an error module on the touch panel 311 via the OCS 166 (S202). If a determination is made that there is no unauthentic module program, the OUS 169 indicates that the module programs to be updated have been normally updated (S203) on the touch panel 311 via the OCS 166, and the updating of the module program ends normally.

Reboot processing (S205) described with reference to FIG. 26 may be executed in the operation described with reference to FIG. 29.

If the electronic signature of an updated module program is determined to be unauthentic (S201), the module program can be recovered (S211) with a module program that has been backed up (S111). Accordingly, in the exemplary embodiment shown in FIG. 29, the checking of the electronic signature related to a module program (S102, S107) is performed after the updating of the module program. The MFP 101 according to an exemplary embodiment shown in FIG. 25 checks the authenticity of a module program after the module program is updated in the same manner.

In FIGS. 24 through 28, the checking of the electronic signature of a module program (S201) is performed in the same manner as that of FIG. 19.

Figure 29:
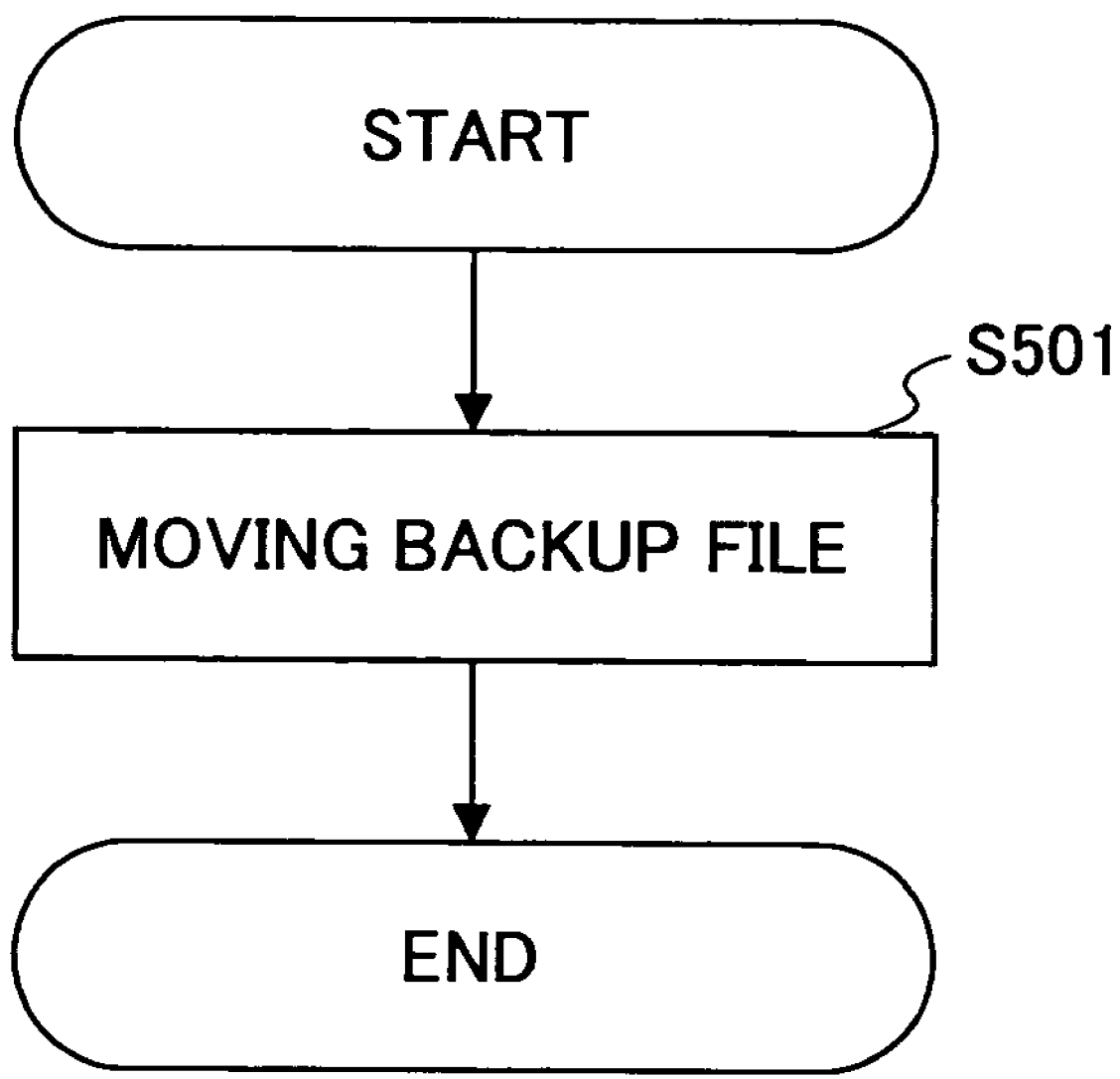
FIG. 29 is a flowchart related to recovery processing.

FIG. 29 is a flowchart related to recovery processing (S211). The OUS 169 moves a backup file in a backup directory (see FIG. 15) to a module directory (see FIG. 15) (S501).

The present invention is not limited to these embodiments, but variations and modifications may be made without departing from the scope of the present invention.

This patent application is based on Japanese Priority Patent Applications No. 2003-76604 filed on Mar. 19, 2003, No. 2004-057678 filed on Mar. 2, 2004, and No. 2004-057679 filed on Mar. 2, 2004, the entire contents of which are hereby incorporated by reference.

What is claimed is:

1. An image forming apparatus, comprising:
a storing unit configured to store a program in accordance with which the image forming apparatus operates;
an acquiring unit configured to acquire an update program from an external source; and
an updating unit configured to determine whether an electronic signature of the update program acquired by said acquiring unit is authentic and, if the electronic signature of the acquired update program is determined to be authentic, update the program stored in said storing unit using the acquired update program, wherein the authentication of the update program is performed based on a message digest, the message digest being generated based on a configuration file of the update program and a unique identification of the external source.

2. The image forming apparatus as claimed in claim 1, wherein said updating unit updates the program stored in said storing unit with the update program acquired by said acquiring unit, and updates an electronic signature of the program stored in said storing unit with the electronic signature of the update program.

3. The image forming apparatus as claimed in claim 1, wherein said acquiring unit is an update recording medium setting unit and the external source is an update recording medium to be set in the update recording medium setting unit, the update recording medium storing the update program and the electronic signature of the update program.

4. An update recording medium that is used with the image forming apparatus as claimed in claim 3, the update recording medium storing the update program and the electronic signature thereof.

5. The image forming apparatus as claimed in claim 1, wherein said acquiring unit is a receiving unit that receives the update program and the electronic signature of the update program from the external source via a network.

6. The image forming apparatus as claimed in claim 1, wherein said storing unit further comprises a recording medium setting unit and a recording medium set therein, the recording medium storing the program.

7. The image forming apparatus as claimed in claim 1, further comprising:

an activating unit that determines whether the electronic signature of the update program and an electronic signature of a configuration file related to the update program are authentic and, if the electronic signature of the update program and the electronic signature of the configuration file related to the update program are determined to be authentic, activates the updated program, wherein said acquiring unit further acquires a configuration file and an electronic signature thereof from the external source; and said activating unit determines whether the electronic signature of the update program and the electronic signature of the configuration file are authentic and, if the electronic signature of the update program and the electronic signature of the configuration file are determined to be authentic, activates the update program in accordance with the configuration file.

8. The image forming apparatus as claimed in claim 7, wherein said activating unit determines whether the electronic signature of the update program is authentic by comparing a message digest generated from the update program and a message digest obtained by decrypting the electronic signature of the update program.

9. The image forming apparatus as claimed in claim 7, wherein said activating unit determines whether the electronic signature of the configuration file is authentic by comparing a message digest generated from the configuration file and a message digest obtained by decrypting the electronic signature of the configuration file.

10. The image forming apparatus as claimed in claim 9, wherein the electronic signature of the configuration file is generated by encrypting a message digest of the configuration file and identification information of the recording medium.

11. The image forming apparatus as claimed in claim 10, wherein the identification information of the recording medium is a serial ID of the recording medium.

12. A method of updating a program stored in a recording medium of an image forming apparatus, comprising the steps of:

acquiring an update program and an electronic signature corresponding to the update program;

determining whether the acquired electronic signature of the update program is authentic; and updating, if the acquired electronic signature of the acquired update program is determined to be authentic, the program stored in the recording medium using the acquired update program, wherein the authentication of the update program is performed based on a message digest, the message digest being generated based on a configuration file of the update program and a unique identification of an external source.

13. The method as claimed in claim 12, wherein if the acquired electronic signature of the update program is determined to be authentic, an electronic signature of the program stored in the recording medium is updated together with the program stored in the recording medium.

14. The method as claimed in claim 12, further comprising the step of:

activating, if the acquired electronic signature of the acquired update program and an acquired electronic signature of an acquired configuration file are determined to be authentic, the updated program in accordance with the acquired configuration file.

15. An image forming apparatus, comprising:

a storing unit that stores a program in accordance with which the image forming apparatus operates;

an acquiring unit that acquires an update program from an external source; and an updating unit that updates the program stored in said storing unit using the update program acquired by said acquiring unit, wherein after updating the program stored in said storing unit, said updating unit determines whether an electronic signature of the updated program is authentic and, if the electronic signature of the updated program is authentic, said updating unit maintains the updated program, and the authentication of the update program is performed based on a message digest, the message digest being generated based on a configuration file of the update program and a unique identification of the external source.

16. The image forming apparatus as claimed in claim 15, wherein said updating unit updates the program stored in said storing unit with the update program acquired by said acquiring unit, and updates an electronic signature of the updated program stored in said storing unit with the electronic signature of the update program acquired by said acquiring unit.

17. The image forming apparatus as claimed in claim 15, wherein said acquiring unit is an update recording medium setting unit and the external source is an update recording medium to be set in the update recording medium setting unit, the update recording medium storing the update program and the electronic signature of the update program.

18. An update recording medium that is used with the image forming apparatus as claimed in claim 17, the update recording medium storing the update program and the electronic signature thereof.

19. The image forming apparatus as claimed in claim 15, wherein said acquiring unit is a receiving unit that receives the update program and the electronic signature of the update program from the external source via a network.

20. The image forming apparatus as claimed in claim 15, wherein said storing unit further comprises a recording medium setting unit and a recording medium set therein, the recording medium storing the program.

21. The image forming apparatus as claimed in claim 15, further comprising:

an activating unit that determines whether the electronic signature of the updated program and an electronic signature of a configuration file related to the updated program are authentic and, if the electronic signature of the updated program and the electronic signature of the configuration file related to the updated program are determined to be authentic, activates the updated program, wherein said acquiring unit further acquires a configuration file and an electronic signature thereof from the external source; and said activating unit determines whether the electronic signature of the updated program and the electronic signature of the configuration file are authentic and, if the electronic signature of the updated program and the electronic signature of the configuration file are determined to be authentic, activates the updated program in accordance with the configuration file.

22. The image forming apparatus as claimed in claim 21, wherein said activating unit determines whether the electronic signature of the updated program is authentic by comparing a message digest generated from the updated program and a message digest obtained by decrypting the electronic signature of the updated program.

23. The image forming apparatus as claimed in claim 21, wherein said activating unit determines whether the electronic signature of the configuration file is authentic by comparing a message digest generated from the configuration file and a message digest obtained by decrypting the electronic signature of the configuration file.

24. The image forming apparatus as claimed in claim 23, wherein the electronic signature of the configuration file is generated by encrypting a message digest of the configuration file and identification information of the recording medium.

25. The image forming apparatus as claimed in claim 24, wherein the identification information of the recording medium is a serial ID of the recording medium.

26. A method of updating a program stored in a recording medium of an image forming apparatus, comprising the steps of:

acquiring an update program from an external source;

updating the program stored in the recording medium using the acquired update program;

determining whether an electronic signature of the updated program is authentic; and maintaining, if the electronic signature of the updated program is determined to be authentic, the updated program, wherein the authentication of the update program is performed based on a message digest, the message digest being generated based on a configuration file of the update program and a unique identification of the external source.

27. The method as claimed in claim 26, wherein an electronic signature of the program stored in the recording medium is updated together with the program stored in the recording medium.

28. The method as claimed in claim 26, further comprising the step of:

activating, if the acquired electronic signature of the updated program and an electronic signature of a configuration file are determined to be authentic, the updated program in accordance with the configuration file.

* * * * *